United States Patent
Sano et al.

(10) Patent No.: US 7,304,923 B2
(45) Date of Patent: Dec. 4, 2007

(54) DISK DRIVE AND DETECTION METHOD USING PRE-PIT DETECTION AND PUSH-PULL SIGNAL GENERATION

(75) Inventors: Tatsushi Sano, Kanagawa (JP); Mitsuyuki Bamba, Saitama (JP); Toshimasa Miyoshi, Kanagawa (JP)

(73) Assignee: Sony Corporation, Tokyo (JP)

( * ) Notice: Subject to any disclaimer, the term of this patent is extended or adjusted under 35 U.S.C. 154(b) by 375 days.

(21) Appl. No.: 10/673,193

(22) Filed: Sep. 30, 2003

(65) Prior Publication Data

US 2004/0136284 A1    Jul. 15, 2004

(30) Foreign Application Priority Data

Oct. 10, 2002    (JP) .............................. 2002-297101

(51) Int. Cl.
  *G11B 7/00* (2006.01)
(52) U.S. Cl. ................................. 369/47.17; 369/53.33
(58) Field of Classification Search ............ 369/47.17, 369/53.33, 47.53; G11B 7/00
  See application file for complete search history.

(56) References Cited

U.S. PATENT DOCUMENTS

| | | | |
|---|---|---|---|
| 5,959,962 A * | 9/1999 | Matsumaru et al. ..... | 369/275.3 |
| 6,058,093 A | 5/2000 | Kato et al. | |
| 6,097,678 A * | 8/2000 | Yoshida et al. .......... | 369/47.48 |
| 6,181,657 B1 * | 1/2001 | Kuroda et al. ............ | 369/59.1 |
| 6,337,838 B1 | 1/2002 | Hikima et al. | |
| 6,341,110 B1 * | 1/2002 | Tawaragi ..................... | 369/47.2 |
| 6,385,257 B1 * | 5/2002 | Tobita et al. ............... | 375/334 |
| 6,456,574 B1 * | 9/2002 | Kato ......................... | 369/47.21 |
| 6,552,983 B1 * | 4/2003 | Yoshida et al. .......... | 369/53.12 |
| 6,556,523 B1 * | 4/2003 | Masui ..................... | 369/47.28 |
| 6,836,458 B2 * | 12/2004 | Adachi .................... | 369/59.26 |
| 6,914,465 B2 * | 7/2005 | Kiyose et al. .............. | 327/156 |
| 7,065,025 B2 * | 6/2006 | Kiyose .................... | 369/53.34 |
| 2002/0048251 A1 | 4/2002 | Hikima et al. | |
| 2003/0053406 A1 | 3/2003 | Muramatsu et al. | |
| 2003/0058764 A1 | 3/2003 | Ueno | |

FOREIGN PATENT DOCUMENTS

| | | |
|---|---|---|
| EP | 1 118 981 A2 | 7/2001 |
| EP | 1 225 570 A2 | 7/2002 |
| EP | 1 225 571 A2 | 7/2002 |

* cited by examiner

*Primary Examiner*—Aristotelis M. Psitos
(74) *Attorney, Agent, or Firm*—Oblon, Spivak, McClelland, Maier & Neustadt, P.C.

(57) ABSTRACT

A push pull signal is detected from a disk-shaped storage medium on which wobbling grooves are formed as recording tracks and address information is recorded by forming pre-pits on lands between adjacent grooves. The detected push-pull signal is compared with a reference voltage thereby generating a land pre-pit detection signal. Of pulses included in the land pre-pit detection signal, those pulses having a small pulse width are regarded as noise pulses and removed thereby obtaining a corrected land pre-pit detection signal. The number of pulses included in the land pre-pit detection signal is counted, and the reference voltage is controlled in accordance with the counted number of pulses.

10 Claims, 15 Drawing Sheets

FIG. 13A
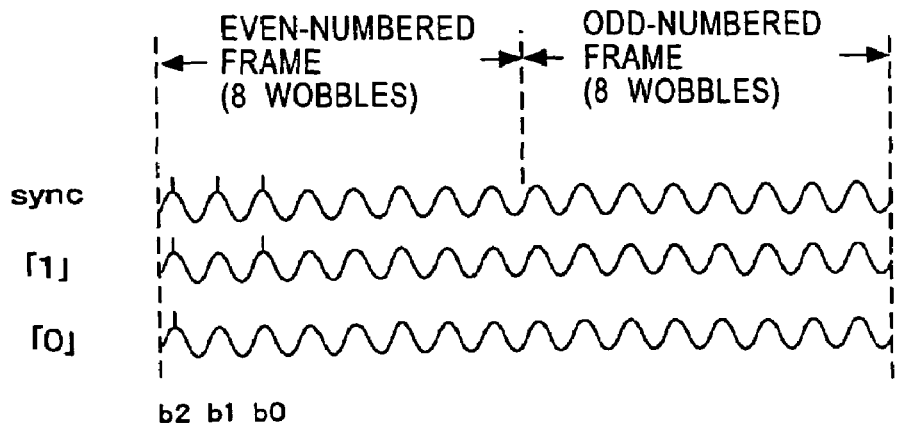
FIG. 13B
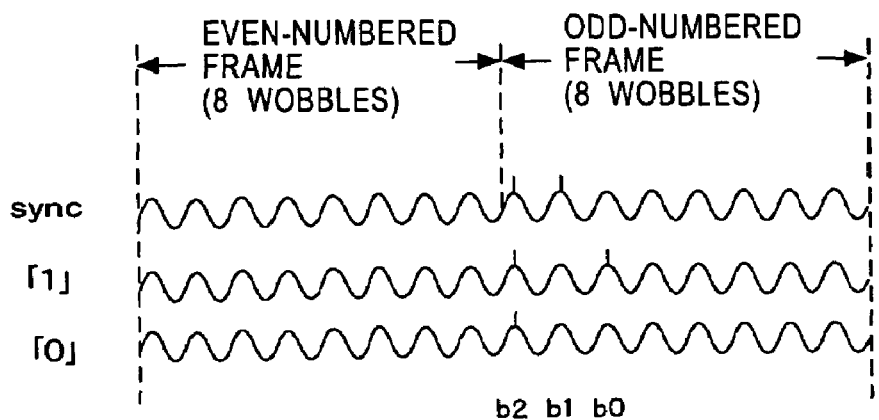
FIG. 13C
|            | b2 | b1 | b0 |
|------------|----|----|----|
| sync(even) | 1  | 1  | 1  |
| sync(odd)  | 1  | 1  | 0  |
| data「1」  | 1  | 0  | 1  |
| data「0」  | 1  | 0  | 0  |

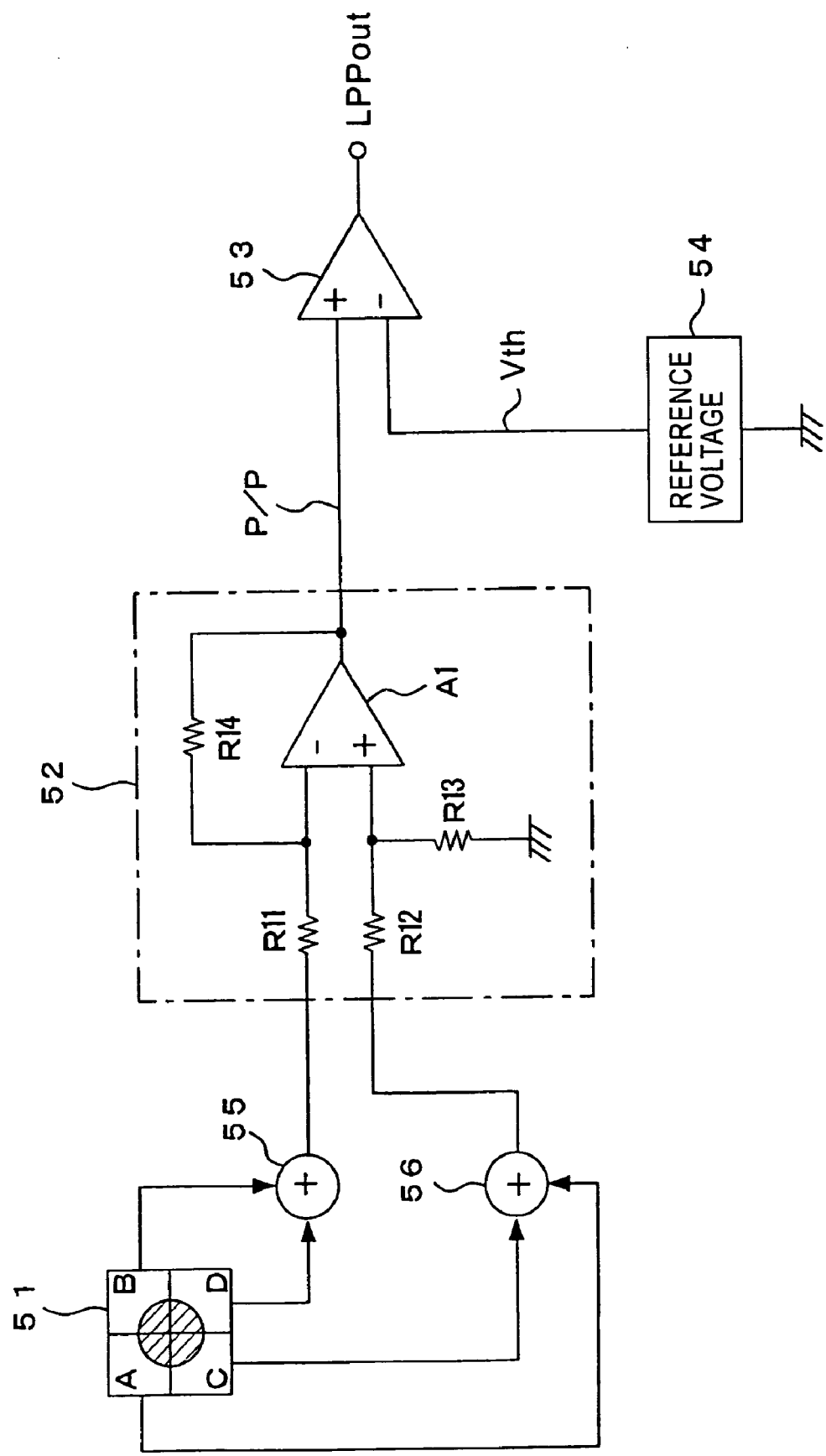

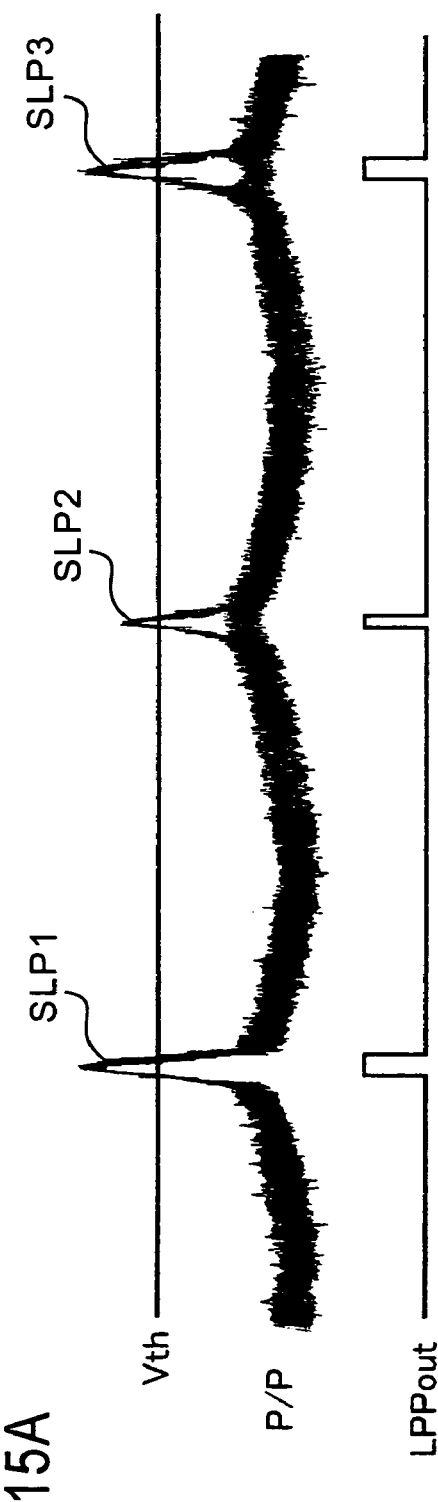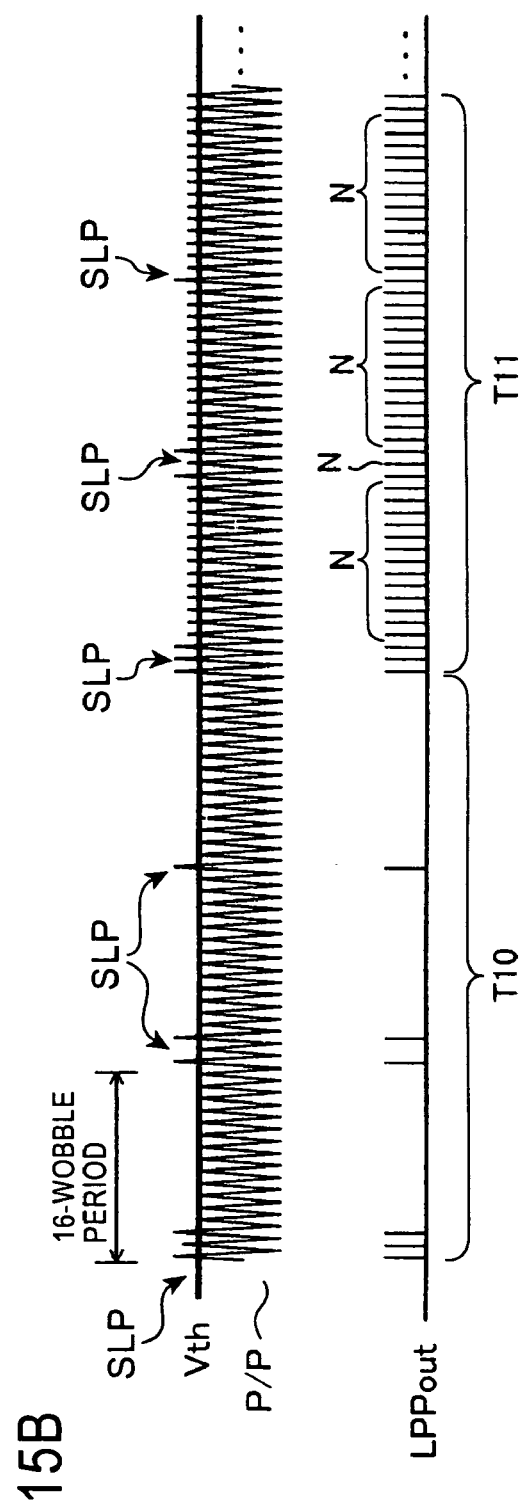
FIG. 15A
FIG. 15B

DISK DRIVE AND DETECTION METHOD USING PRE-PIT DETECTION AND PUSH-PULL SIGNAL GENERATION

BACKGROUND OF THE INVENTION

1. Field of the Invention

The present invention relates to a disk drive for writing/reading data on/from a disk-shaped storage medium such as an optical disk and also to a method of detecting pre-pits.

2. Description of the Related Art

In order to write data on a disk, it is required that the disk has guide means for forming data tracks. To meet the above requirement, grooves serving as pre-grooves are formed and resultant grooves or lands (protrusions having the shape of plateau in cross section between adjacent grooves) are used as data tracks.

In order to write data at a desired location on a data track, it is required that an address information be recorded on the disk. The address information is generally recorded by wobbling the grooves or by forming pre-pits on the data tracks.

For example, in the case of DVD-RW that is a rewritable version of DVD (Digital Versatile Disc) based on the phase change recording or DVD-R that is a write-once disk using an organic dye material, wobbling grooves G are formed as pre-format on the disk and land pre-pits LPP are formed on lands L between adjacent grooves G, as shown in FIG. 12.

In this structure, reflected-light information provided by the wobbling grooves is used to control the rotation of the disk and also used to produce a master clock signal used in writing data. The land pre-pits are used to determine precise write locations of respective bits and also used to acquire various kinds of disk information such as pre-address information. That is, addresses indicating the physical locations on the disk are recorded using land pre-pits LPP.

A disk drive adapted to such a disk reads addresses by detecting land pre-pits formed on the disk and performs various controls in the writing/reading operation on the basis of the detected pre-pit information indicating the location on the disk.

FIG. 13 shows a format of land pre-pits LPP.

Each interval of a track including 8 wobbles forms one frame, and each set of one even-numbered frame and one odd-numbered frame, including a total of 16 wobbles, forms one unit of land pre-pit information.

As shown in FIG. 12, land pre-pits LPP are formed by forming cutouts in the lands in synchronization with wobbles. One bit of address data is expressed by one set of land pre-pits LPP.

FIG. 13A shows an example in which land pre-pit information is formed in even-numbered frames. In this case, first 3 wobbles of each even-numbered frame form one set of land pre-pits LPP.

Let b2, b1, and b0 represent the presence/absence of land pre-pits LPP. If (b2, b1, b0) is (1, 1, 1), that is, when three land pre-pits are formed, a set of those pre-pits LPP serves as a sync signal. A data bit of "1" is expressed by forming two land pre-pits LPP at b2 and b0. That is, when (b2, b1, b0)=(1, 0, 1), the data bit is "1". On the other hand, a data bit of "0" is expressed by forming one pre-pit LPP at b2. That is, when (b2, b1, b0)=(1, 0, 0), the data bit is "0".

FIG. 13B shows an example in which land pre-pit information is formed in odd-numbered frames. In this case, first 3 wobbles of each odd-numbered frame form one set of land pre-pits LPP whose absence/presence are expressed by (b2, b1, b0).

In the case in which land pre-pit information is formed in odd-numbered frames, when (b2, b1, b0)=(1, 1, 0), a set of those land pre-pits represents a sync signal. As in even-numbered frames, a data bit of "1" is represented by (b2, b1, b0)=(1, 0, 1), and a data bit of "0" is represented by (b2, b1, b0)=(1, 0, 0).

In FIG. 13C, sync signals and data bits represented by combinations of b2, b1, and b0 are summarized in the form of a table.

In each 16-wobble interval, land pre-pits LPP are formed only in either an even-numbered frame or an odd-numbered frame. Determination as to in which frame to form land pre-pits LPP is made for each 16-wobble interval such that land pre-pits LPP are not formed on both adjacent groove tracks on a disk.

Information expressed by land pre-pits LPP can be acquired in the form of a push-pull signal by detecting light reflected from a disk. More specifically, the push-pull signal is obtained as a differential signal between signals corresponding to the intensities of light reflected from a left-hand part and a right-hand part of a laser spot scanning on the disk in a track line direction.

FIG. 14 shows a circuit for detecting land pre-pits LPP.

The disk drive has an optical head including a photodetector 51, such as a quadrant photodetector having four photodetector elements A, B, C, and D, for detecting light reflected from a disk.

In this circuit shown in FIG. 14, signals output from the photodetector elements A and C of the photodetector 51 are added together by an adder 56, and signals output from the photodetector elements B and D are added together by an adder 55. The outputs of the adders 55 and 56 are supplied to a push-pull signal generator 52. The push-pull signal generator 52 includes a differential amplifier A1 and resistors R11 to R14.

The push-pull signal generator 52 outputs a push-pull signal P/P proportional to ((A+C)−(B+D)).

In the push-pull signal P/P, as shown in FIG. 15A, relatively large amplitudes (SLP1, SLP2, and SLP3) corresponding to land pre-pits LPP are obtained. Thus, information represented by land pre-pits LPP can be detected by detecting the large amplitudes.

To achieve the above, a reference voltage Vth is supplied from a reference voltage source 54 to a comparator 53, and the comparator 53 compares the push-pull signal P/P with the supplied reference voltage Vth. The comparator 53 outputs a two-level signal indicating the comparison result. Thus, a detection signal LPPout corresponding to the land pre-pits LPP is obtained as shown in FIG. 15A.

High and low levels of this detection signal LPPout corresponding to the land pre-pits LPP correspond to "1" and "0", respectively, of b2, b1, and b0 of the land pre-pits LPP.

Furthermore, a decoder (not shown) extracts address information by detecting sync signals and data bits (with a level of "1" or "0") corresponding to b2, b1, and b0.

A known technique of detecting land pre-pits LPP may be found, for example, in U.S. Pat. No. 6,337,838.

However, if information is written on grooves serving as recording tracks, recording marks (phase change bits) formed on the grooves interfere with the land pre-pits LPP. As a result, it becomes difficult to correctly read the land pre-pits LPP. More specifically, the interference of recording marks results in a reduction in reflectance, and thus a reduction occurs in amplitude of the push-pull signal P/P corresponding to the land pre-pits LPP.

The push-pull signal P/P has amplitude variations due to wobbling of tracks, crosstalk from adjacent tracks, and a variation in quality of the disk.

In the example shown in FIG. 15A, the amplitude SLP2 is smaller than the amplitudes SLP1 and SLP3.

The reduction in the amplitude SLP2 is caused by presence of a recording mark M adjacent to the land pre-pit LPP, as represented by i in FIG. 12.

As can be seen from the envelope of the waveform of the push-pull signal P/P shown in FIG. 15A, the push-pull signal P/P has a periodic variation in level caused by wobbles. The push-pull signal P/P also includes a variation in level due to crosstalk noise.

Such a variation in level of the push-pull signal P/P can result in noise in the detection signal LPPout corresponding to land pre-pits detected by comparing the push-pull signal P/P with the reference voltage Vth.

FIG. 15B shows an example of a push-pull signal P/P including pulse components SLP corresponding to land pre-pits LPP that appear every 16-wobble interval. In this example, for a period T10, a correct land pre-pit detection LPPout is obtained by comparing the push-pull signal P/P with the reference voltage Vth.

However, in a period T11, the level of the push-pull signal P/P increases to such an extent that not only the level of the pulse components SLP corresponding to land pre-pits LPP but also the level of other parts of the push-pull signal P/P exceeds the reference voltage Vth. As a result, as shown in FIG. 15B, the land pre-pit detection signal LPPout includes noise pulses N.

Incorrect detection of land pre-pits LPP results in an increase in address error rate. That is, it becomes impossible to correctly read address information. This results in degradation in performance of operation of writing/reading data on/from a disk and also degradation in seeking operation.

Such noise pulses can be avoided if the reference voltage Vth is increased. However, the increase in the reference voltage Vth can make it impossible to detect land pre-pit information with a level lowered by the presence of a nearby recording mark, as is the case with the pulse component SLP2 in FIG. 15A.

Conversely, if the threshold voltage Vth is reduced so that land pre-pits can be detected for small-amplitude pulse components such as SLP2, the reduction in the threshold voltage Vth results in a possibility that noise is erroneously detected as a land pre-pit.

For the above reason, it is difficult to correctly detect land pre-pits using a fixed threshold voltage (reference voltage) Vth.

U.S. Pat. No. 6,337,838 cited above discloses a technique of reducing the variation in amplitude of the push-pull signal P/P by using a so-called AGC circuit. However, U.S. Pat. No. 6,337,838 does not disclose a technique of properly setting a threshold value used in producing the land pre-pit detection signal LPPout.

SUMMARY OF THE INVENTION

In view of the above, it is an object of the present invention to provide a disk drive capable of correctly detecting land pre-pits even in a situation in which the amplitude of a push-pull signal varies due to wobbling, noise, and/or interference of recording marks.

In an aspect, the present invention provides a disk drive comprising an optical head for emitting a laser beam so as to illuminate a disk-shaped storage medium thereby writing or reading data on or from the disk-shaped storage medium, grooves serving as recording tracks being formed in a wobbling fashion on the disk-shaped storage medium, pre-pits being formed on lands between adjacent grooves, a push-pull signal generator for generating a push-pull signal from reflected-light information detected by the optical head, a pre-pit detector for comparing the push-pull signal with a reference signal and outputting a comparison result as a pre-pit detection signal, and a noise remover for detecting a noise pulse on the basis of the pulse width of a pulse included in the detection signal output from the pre-pit detector, removing the noise pulse from the detection signal, and output the detection signal including no noise pulse.

In another aspect, the present invention provides a disk drive comprising an optical head for emitting a laser beam so as to illuminate a disk-shaped storage medium thereby writing or reading data on or from the disk-shaped storage medium, grooves serving as recording tracks being formed in a wobbling fashion on the disk-shaped storage medium, pre-pits being formed on lands between adjacent grooves, a push-pull signal generator for generating a push-pull signal from reflected-light information detected by the optical head, a pre-pit detector for comparing the push-pull signal with a reference signal and outputting a comparison result as a pre-pit detection signal, a counter for counting the number of pulses included in the detection signal output from the pre-pit detector, for each of predetermined periodic intervals, and a controller for changing the reference signal depending on the count value of the counter.

In another aspect, the present invention provides a disk drive comprising an optical head for emitting a laser beam so as to illuminate a disk-shaped storage medium thereby writing or reading data on or from the disk-shaped storage medium, grooves serving as recording tracks being formed in a wobbling fashion on the disk-shaped storage medium, pre-pits being formed on lands between adjacent grooves, a push-pull signal generator for generating a push-pull signal from reflected-light information detected by the optical head, a pre-pit detector for comparing the push-pull signal with a reference signal and outputting a comparison result as a pre-pit detection signal, a noise remover for detecting a noise pulse on the basis of the pulse width of a pulse included in the detection signal output from the pre-pit detector, removing the noise pulse from the detection signal, and output the detection signal including no noise pulse, a counter for counting the number of pulses included in the detection signal output from the pre-pit detector or included in the detection signal output from the noise remover, for each of predetermined periodic intervals, a controller for changing the reference signal depending on the count value of the counter, and an address decoder for acquiring the address information represented by the pre-pits, from the noise-removed detection signal.

In another aspect, the present invention provides a method of detecting pre-pits formed on a disk-shaped storage medium, grooves serving as recording tracks being formed in a wobbling fashion on the disk-shaped storage medium, address information being represented by the pre-pits formed on lands between adjacent grooves, the method comprising the steps of generating a push-pull signal from reflected-light information obtained when the disk-shaped storage medium is illuminated with a laser beam, comparing the push-pull signal with a reference signal and outputting a comparison result as a pre-pit detection signal, and detecting a noise pulse on the basis of the pulse width of a pulse included in the output detection signal, removing the detected noise pulse from the detection signal, and outputting the detection signal including no noise pulse.

In another aspect, the present invention provides a method of detecting pre-pits formed on a disk-shaped storage medium, grooves serving as recording tracks being formed in a wobbling fashion on the disk-shaped storage medium, address information being represented by the pre-pits formed on lands between adjacent grooves, the method comprising the steps of generating a push-pull signal from reflected-light information obtained when the disk-shaped storage medium is illuminated with a laser beam, comparing the push-pull signal with a reference signal and outputting a comparison result as a pre-pit detection signal, counting the number of pulses included in the output detection signal, for each of predetermined periodic intervals, and changing the reference signal depending on the count value.

In another aspect, the present invention provides a method of detecting pre-pits formed on a disk-shaped storage medium, grooves serving as recording tracks being formed in a wobbling fashion on the disk-shaped storage medium, address information being represented by the pre-pits formed on lands between adjacent grooves, the method comprising the steps of generating a push-pull signal from reflected-light information obtained when the disk-shaped storage medium is illuminated with a laser beam, comparing the push-pull signal with a reference signal and outputting a comparison result as a pre-pit detection signal, detecting a noise pulse on the basis of the pulse width of a pulse included in the output detection signal, removing the detected noise pulse from the detection signal, and outputting the detection signal including no noise pulse, counting the number of pulses included in the output detection signal, for each of predetermined periodic intervals, and changing the reference signal depending on the count value.

In the present invention, as described above, the land pre-pit detection signal is produced by comparing the push-pull signal with the reference signal, and noise pulses included in the land pre-pit detection signal are detected by detecting pulses having a pulse width smaller than the predetermined value. The detected noise pulses are removed from the land pre-pit detection signal, and thus the correct land pre-pit detection signal including no noise pulses is obtained.

In the correct land pre-pit detection signal, the number of pulses in each particular period corresponding to a 16-wobble interval is limited to a particular range. That is, the number of pulses must be equal to 1 to 3. If the observed number of pulses does not fall within the above range, the land pre-pit detection signal includes a noise pulse. Thus, the number of pulses is monitored, and the reference signal is adjusted depending on the measured number of pulses.

BRIEF DESCRIPTION OF THE DRAWINGS

FIG. 13 is a diagram showing a format of a land pre-pit signal;

FIG. 14 is a block diagram showing a circuit for detecting land pre-pits according to a conventional technique; and FIG. 15 is a diagram showing an operation of detecting land pre-pits according to the conventional technique.

DESCRIPTION OF THE PREFERRED EMBODIMENTS

The present invention is described in further detail below with reference to preferred embodiments. In those embodiments described below, by way of example, a disk drive (writing/reading device) is assumed to be adapted to an optical disk of the type of DVD-R or DVD-RW.

First, with reference to FIG. 1, a basic construction of a disk drive, which is common for all embodiments, is described, and then various examples of the configuration of a land pre-pit extractor 24 are described with reference to first to sixth embodiments.

Figure 1:
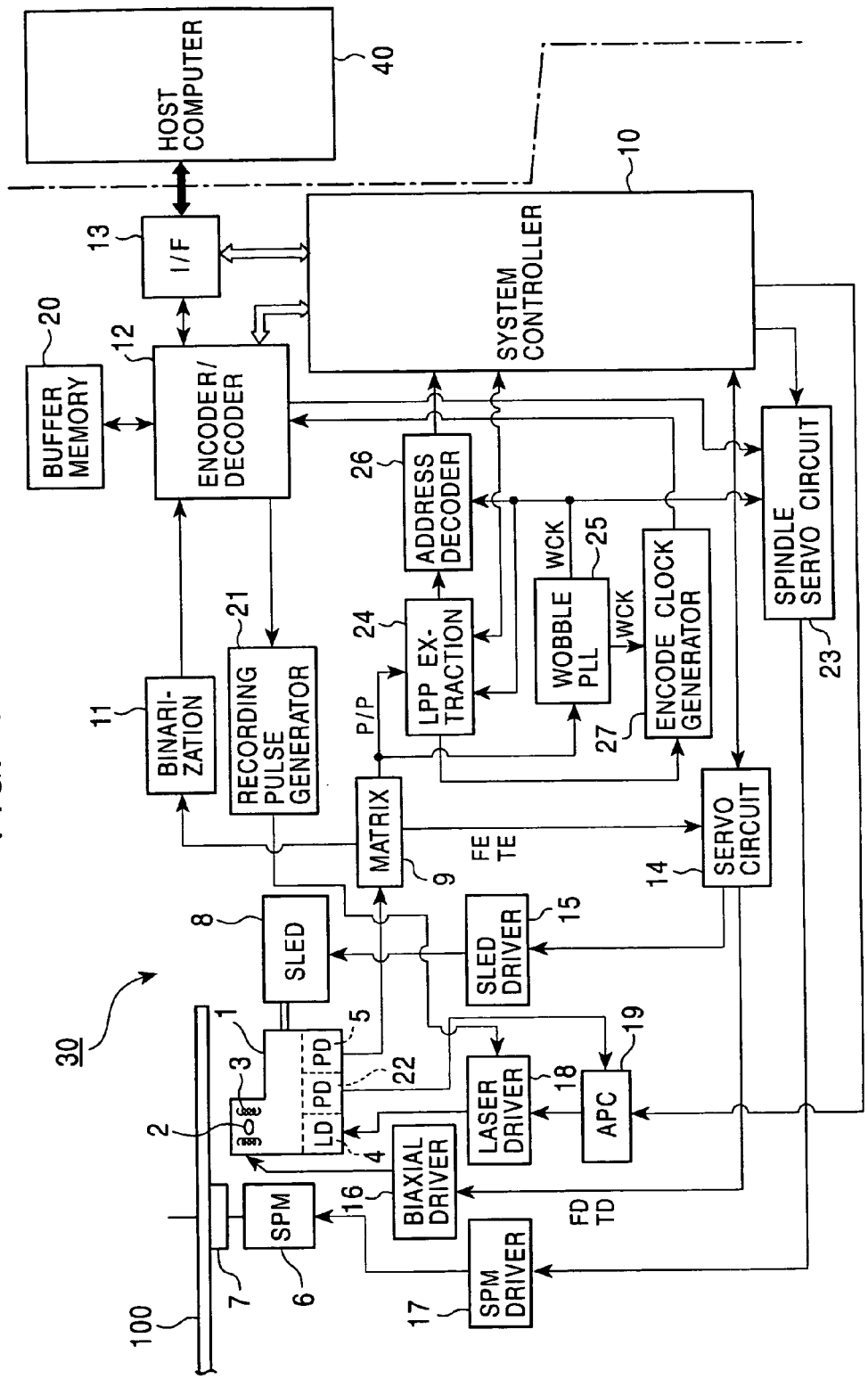
FIG. 1 is a block diagram showing a disk drive according to an embodiment of the present invention.

FIG. 1 shows the construction of a disk drive 30 according to an embodiment of the present invention.

A disk 100 such as a DVD-R or DVD-RW disk is placed on a turn table 7 and is rotated at a constant linear velocity (CLV) by a spindle motor 6 during a writing/reading operation. An optical pickup 1 reads pit mark data recorded on tracks (groove tracks) on the disk 100, wobbling information of tracks, and land pre-pit information. Data pits are formed as dye change pits or phase change pits on tracks in the form of grooves thereby recording data on the disk.

The pickup 1 includes, in the inside thereof, a laser diode 4 serving as a source of laser light, a photodetector 5 for detecting reflected light, an objective lens 2 via which the laser light is emitted to the outside, and an optical system (not shown) for illuminating the recording surface of the disk with the laser light via the objective lens 2 and for guiding reflected light to the photodetector 5.

The pickup 1 also includes a monitor detector 22 to which a part of the light output from the laser diode 4 is supplied.

The laser diode 4 outputs laser light with a wavelength of 650 nm or 635 nm. The optical system has a NA of 0.6.

The objective lens 2 is supported by a biaxial mechanism 3 such that the objective lens 2 is movable in tracking and focusing directions.

The pickup 1 is driven in a radial direction of the disk by a sled mechanism 8.

The laser diode 4 of the pickup 1 is driven by a drive signal (drive current) output from a laser driver 18. The laser diode 4 emits laser light in accordance with the drive signal.

Reflected light information from the disk 100 is detected by the photodetector 5 and converted into an electric signal corresponding to the intensity of the reflected light. The resultant electric signal is supplied to a matrix circuit 9.

The matrix circuit 9 includes a current-voltage converter for converting the current signals output from a plurality of photodetector elements of the photodetector 5 into voltage signals and also includes a matrix operation/amplification circuit for generating necessary signals by means of matrix operation.

The signals generated by the matrix operation/amplification circuit include an RF signal corresponding to data read from the disk, a focus error signal FE and a tracking error signal TE used in servo control.

Furthermore, the matrix operation/amplification circuit also produces a push-pull signal P/P associated with land pre-pits and wobbling of grooves. The push-pull signal P/P is also used as a tracking error signal.

The RF signal output from the matrix circuit 9 is supplied to a binarization circuit 11, and the focus error signal FE and the tracking error signal TE are supplied to a servo circuit 14. The push-pull signal P/P is supplied to the land pre-pit extractor 24 and a wobble PLL 25.

The push-pull signal P/P is converted into a two-level signal by the land pre-pit extractor 24. The resultant signal is supplied as land pre-pit information to an address decoder 26. The address decoder 26 decodes the preformatted address information. The resultant decoded address information is supplied to a system controller 10.

The wobble PLL 25 generates a wobble clock WCK from the push-pull signal P/P by means of PLL operation. The generated wobble clock WCK is supplied to an encode clock generator 25, the address decoder 26, a spindle servo circuit 23, and the land pre-pit extractor 24.

The RF signal output from the matrix circuit 9 is converted into a two-level signal by the binarization circuit 11 and is supplied to an encoder/decoder 12.

The encoder/decoder 12 includes a decoder used in the reading operation and an encoder used in the writing operation.

In the reading operation, the encoder/decoder 12 performs a decoding process including decoding of a run-length-limited code, error correction, and deinterleaving, thereby producing reproduced data.

Furthermore, in the reading operation, the encoder/decoder 12 generates a reproduced clock synchronized with the RF signal by means of the PLL operation and performs the above-described decoding process in accordance with the reproduced clock.

In the reading operation, decoded data output from the encoder/decoder 12 is stored in a buffer memory 20.

The data stored in the buffer memory 20 is read out and output to the outside of the disk drive 30.

An interface 13 connected to an external host computer 40 serves to interface with the host computer 40 in transmitting/receiving reproduced data, data to be stored, or various commands.

In the reading operation, the data decoded and stored in the buffer memory 20 is read out and transferred to the host computer 40 via the interface 13.

A read command and a write command output from the host computer 40 are supplied to the system controller 10 via the interface 13.

On the other hand, in the writing operation, data to be written is output from the host computer 40 and is stored in the buffer memory 20 via the interface 13.

In the writing operation, the encoder/decoder 12 encodes the data stored in the buffer memory 20, wherein the encoding includes addition of error correction codes, interleaving, addition of sub-codes, and run-length-limited coding of the data to be written on the disk 100.

The encode clock used as a reference cock in the writing operation is generated by an encode clock generator 27. In synchronization with the encode clock signal, the encoder/decoder 12 performs encoding.

The encode clock generator 27 generates the encode clock on the basis of the wobble clock WCK supplied from the wobble PLL 25 and the land pre-pit information supplied from the land pre-pit extractor 24.

The data to be written, produced via the encoding performed by the encoder/decoder 12, is converted into recording pulses by a recording pulse generator 21 and supplied to the laser driver 18.

The recording pulse generator 21 also makes recording compensation in terms of the characteristic of the recording layer, the shape of the laser spot, the fine adjustment of the optimum writing power depending on the linear velocity of the disk, and adjustment of the waveform of the laser driving pulse.

The laser driver 18 supplies a driving current to a laser diode 4 in accordance with the supplied laser driving pulse thereby driving the laser diode 4 to emit a laser beam. As a result, bits (dye change bits/phase change bits) corresponding to the recording data are formed on the disk 100.

An APC (Auto Power Control) circuit 19 monitors the output power of the laser by using the monitor detector 22 and controls the output power of the laser such that the output power is maintained at a constant value regardless of temperature and other factors. More specifically, a target value of the laser output power is given by the system controller 10, and the APC circuit 19 controls the laser driver 18 such that the laser output power is maintained at the target value.

The servo circuit 14 generates servo drive signals associated with focusing, tracking, and the sled from the focus error signal FE and the tracking error signal TE output from the matrix circuit 9, whereby the servo circuit 14 servo-controls the focusing, tracking, and the operation of the sled.

More specifically, the servo circuit 14 generates a focus drive signal FD and a tracking drive signal TD on the basis of the focus error signal FE and the tracking error signal TE and the supplies the generated focus drive signal FD and tracking drive signal TD to a biaxial driver 16. In accordance with the supplied focus drive signal FD and tracking drive signal TD, the biaxial driver 16 drives a focus coil and a tracking coil of the biaxial mechanism 3 of the pickup 1. Thus, a tracking servo loop and a focus serve loop are formed by the pickup 1, the matrix circuit 9, the servo processor 14, and the biaxial driver 16, and the biaxial mechanism 3.

If the servo circuit 14 receives a track jump command from the system controller 10, the servo circuit 14 turns off the tracking servo loop and outputs a jump drive signal to the biaxial driver 16 thereby making the biaxial driver 16 perform a track jump operation.

Furthermore, the servo circuit 14 generates a sled drive signal in accordance with a sled error signal obtained as a low-frequency component of the tracking error signal TE and in accordance with an access command supplied from the system controller 10. The generated sled drive signal is supplied to a sled driver 15. In accordance with the supplied sled drive signal, the sled driver 15 drives the sled mechanism 8. Although not shown in the figure, the sled mechanism 8 includes a main shaft for holding the pickup 1, a sled motor, and a transmission gear, whereby the sled mechanism 8 slides the pickup 1 in cooperation with the sled motor 8 driven by the sled drive signal output from the sled driver 15.

A spindle serve circuit 23 controls the spindle motor 6 so as to rotate at a constant linear velocity.

In the writing operation, the spindle servo circuit 23 detects rotation speed information indicating the current rotation speed of the spindle motor 6 from the wobble clock WCK generated by the wobble PLL and the spindle servo circuit 23 compares the detected rotation speed information with a predetermined CLV reference information thereby generating a spindle error signal SPE.

In the reading operation, the rotation speed information indicating the current rotation speed of the spindle motor 6 is given by the reproduced clock (used as the reference clock in decoding) generated by the PLL in the encoder/decoder 21, and spindle servo circuit 23 generates the spindle error signal SPE by comparing the reproduced clock with the predetermined CLV reference information.

The spindle servo circuit 23 generates the spindle drive signal in accordance with the spindle error signal SPE and supplies the generated spindle drive signal to the spindle motor driver 17. The spindle motor driver 17 generates a 3-phase drive signal in accordance with the supplied spindle drive signal and supplies the generated 3-phase drive signal to the spindle motor 6 thereby driving the spindle motor 6 at the constant linear velocity (CLV).

Furthermore, the spindle servo circuit 23 generates a spindle drive signal in accordance with a spindle kick/brake control signal supplied from the system controller 10. In accordance with the spindle drive signal supplied from the spindle servo circuit 23, the spindle motor driver 17 starts, stops, accelerates, and decelerates the spindle motor 6.

The above-described operations of the servo system and the writing/reading system are controlled by the system controller 10 formed of a microcomputer.

The system controller 10 performs various processes in accordance with commands issued by the host computer 40.

For example, if the host computer 40 issues a read command to read data recorded on the disk 100, in response to the command, first, the system controller 10 controls the seeking operation to seek a specified address. More specifically, the system controller 10 issues a command to the servo circuit 14 to move the pickup 1 to the address specified by the seek command.

Thereafter, system controller 10 controls necessary parts to read data from specified sectors and transfer the read data to the host computer 40. More specifically, requested data is read from the disk 100, decoded, buffered, and transferred to the host computer 40.

If a write command is issued by the host computer 40, the system controller 10 moves the pickup 1 to a location corresponding to a specified address at which data is to be written. The encoder/decoder 12 encodes the data supplied from the host computer 40.

The recording pulse generator 21 supplies laser driving pulse to the laser driver 18. Thus, the data is written on the disk.

The writing/reading operation of the disk drive 30 is summarized below.

Reading Operation

Servo Operation

A signal detected by the pickup 1 is converted by the matrix circuit 9 into servo error signals such as the focus error signal FE and the tracking error signal TE. The resultant servo error signals are supplied to the servo circuit 14. The biaxial mechanism 3 of the pick up 1 is driven by the driving signal FD and TD output from the servo circuit 14, and thus the focusing and the tracking are servo-controlled.

Reading of Data

The signal detected by the pickup 1 is converted by the matrix circuit 9 into the RF signal and supplied to the encoder/decoder 12. The encoder/decoder 12 reproduces a channel clock and decodes the RF signal on the basis of the channel clock. The decoded data is supplied to the interface 13.

Controlling of Rotation

The rotation of the disk 100 is controlled by the spindle servo circuit 23 on the basis of the channel clock supplied from the encoder/decoder 12.

Detection of Address

Addresses are included in the RF signal and are extracted by the encoder/decoder 12. The extracted addresses are supplied to the system controller 10.

However, in the seeking operation, addresses are extracted from the land pre-pits and seeking to a target location is performed in accordance with the extracted addresses.

Controlling of Laser

The APC circuit 19 controls the laser output power at the constant value specified by the system controller 10.

Writing Operation

Servo Operation

The servo operation is performed in a similar manner to the reading operation except that a correction is made by the matrix circuit 9 or the servo circuit 14 so that the high output power of the laser does not result in an increase in gain.

Writing of Data

Data to be written is acquired via the interface 13. The encoder/decoder 12 performs channel coding including ECC addition, rearrangement, and modulation, on the data. After the channel coding, the data is converted by the recording pulse generator 21 into laser driving pulses in the form suitable for writing the data on the disk 100. The laser driving pulses are supplied to the laser diode 4 of the pickup 1 via the laser driver 18 (APC circuit 19).

Control of Rotation

From the push-pull signal P/P output from the matrix circuit 9, the wobble PLL generates the wobble clock WCK. In accordance with the wobble clock WCK, the spindle servo circuit 23 controls the rotation at the constant linear velocity (CLV).

Detection of Addresses

The push-pull signal P/P output from the matrix circuit 9 is supplied to the land pre-pit extractor 24, and land pre-pit information is detected. The detected land pre-pit information is decoded by the address decoder 26 into an address value and interpreted by the system controller 10.

The land pre-pit information is also supplied to the encode clock generator 27. From the land pre-pit information, the encode clock generator 27 generates the encode clock and supplies it to the encoder/decoder 12.

Although in the example shown in FIG. 1, the disk drive 30 is connected to the host computer 40, the disk drive 30 according to the present invention is not necessarily needed to be connected to the host computer 40 or the like. When the disk drive 30 is not connected to the host computer 40 or a similar device, the disk drive 30 may include an operation control unit and a display, and the configuration associated with the data input/output interface may be modified so that input data is written or read data is output in accordance with a command issued by an user via the operation control unit.

First Embodiment

In the disk drive 30 described above, a specific circuit configuration for detecting land pre-pits formed on a disk and the operation of the circuit, according to a first embodiment, are described below with reference to FIGS. 2 and 3.

Figure 2:
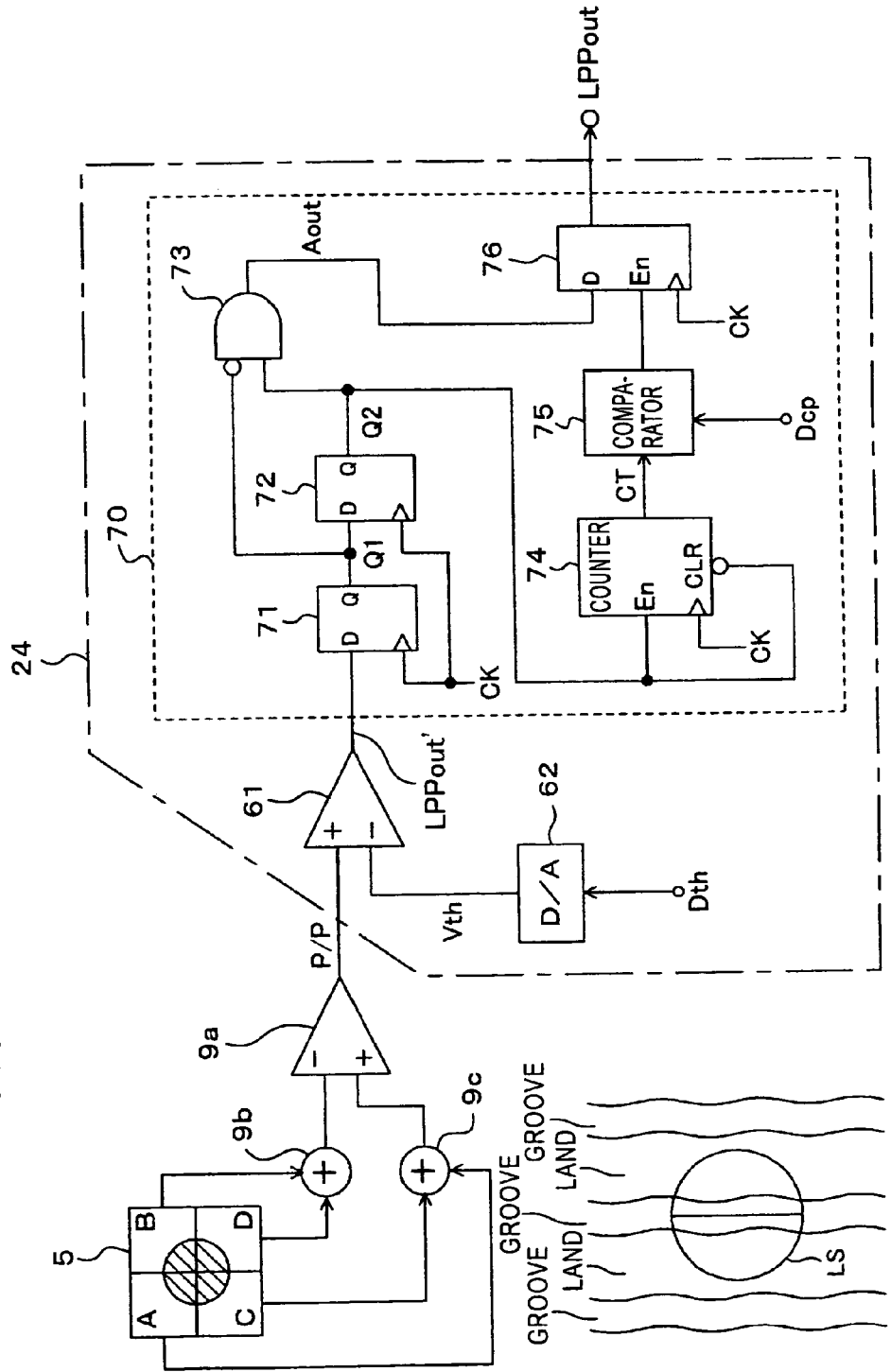
FIG. 2 is a block diagram showing a circuit for detecting land pre-pits according to a first embodiment of the present invention.

Of various parts of the disk drive 30, a part serving to detect land pre-pits is shown in FIG. 2. The part includes the photodetector 5 of the pickup 1, the adders 9b and 9c and the differential amplifier 9a of the matrix circuit 9, and the land pre-pit extractor 24.

Although not shown in FIG. 2, the matrix circuit 9 includes not only the differential amplifier 9a and the adders 9b and 9c for generating the push-pull signal P/P but also a circuit part for generating the RF signal, the focus error signal FE, and the tracking error signal TE.

As shown in FIG. 2, the photodetector 5 is of the quadrant type including four photodetector elements A, B, C, and D. Light reflected from a disk is detected by respective photodetector elements A, B, C, and D, and converted into current signals corresponding to the intensity of light. The current signals output from the photodetector elements A, B, C, and D are converted into voltage signals by the matrix circuit 9. From those voltage signals, the focus error signal FE, and the push-pull signal P/P, and other signals are produced. The process of producing the push-pull signal P/P is described below.

The push-pull signal P/P is produced from an optical signal reflected from a left-hand half of a laser spot LS scanning on a track in a track line direction and an optical signal reflected from a right-hand half of the laser spot LS. The difference between the signal A+C output from the adder 9c and the signal B+D output from the adder 9b is calculated by the differential amplifier 9a, and thus the push-pull signal P/P is obtained, wherein the signal A+C is the sum of voltage signals obtained from the current signals output from the photodetector elements A and C, respectively, and the signal B+D is the sum of voltage signals obtained from the current signals output from the photodetector elements B and D, respectively.

As described earlier with reference to FIG. 1, the push-pull signal P/P is supplied to the wobble PLL 25 to generate the wobble clock WCK synchronized with wobbling of grooves.

The push-pull signal P/P is also supplied to the land pre-pit extractor 24.

The land pre-pit extractor 24 includes a comparator 61, a digital-to-analog converter 62, and a noise remover 70.

In the land pre-pit extractor 24, the push-pull signal P/P is applied to the comparator 61.

The reference voltage data Dth is supplied to the digital-to-analog converter 62 from the system controller 10 shown in FIG. 1. The digital-to-analog converter 43 converts the reference voltage data Dth into a corresponding analog voltage and supplies the resultant analog voltage as a reference voltage Vth to the comparator 61.

The comparator 61 compares the push-pull signal P/P with the reference voltage Vth. If the push-pull signal P/P is greater than the reference voltage Vth, the comparator 61 outputs "1". The output from the comparator 61 serves as the land pre-pit detection signal LPPout' whose level of "1" corresponds to the land pre-pits LPP.

This land pre-pit detection signal LPPout' corresponds to the detection signal LPPout in the conventional technique described earlier with reference to FIG. 15, and there is a possibility that the land pre-pit detection signal LPPout' includes noise pulses as described earlier.

In the present example shown in FIG. 2, the land pre-pit detection signal LPPout', which might include noise pulses, is supplied to the noise pulse remover 70 to remove the noise pulses. A land pre-pit detection signal LPPout including no noise pulses is output from the noise pulse remover 70 and supplied to the address decoder 26 shown in FIG. 1 to obtain address information.

The noise pulse remover 70 includes a D flip-flops 71 and 72, a AND gate 73, a counter 74, a comparator 75, and a holding circuit 76. A clock CK applied to those circuit elements is generated, for example, from the wobble clock WCK described earlier with reference to FIG. 1.

A falling-down edge detector is formed by the D flip-flops 71 and 72 and the AND gate 73 whose one input terminal is an inverting input terminal.

The detection signal LPPout' output from the comparator 61 is applied to the D-input terminal of the D flip-flop 71 and is latched by the D flip-flop 71 when the clock CK is applied to the D flip-flop 71. The output Q1 from the D flip-flop 71 is supplied to the D flip-flop 72, and the inverted signal of Q1 is supplied to the AND gate 73.

The output Q2 of the D flip-flop 72 is supplied to the AND gate 73 and also supplied, as an enable signal and a clear signal, to the counter 74.

Figure 3:
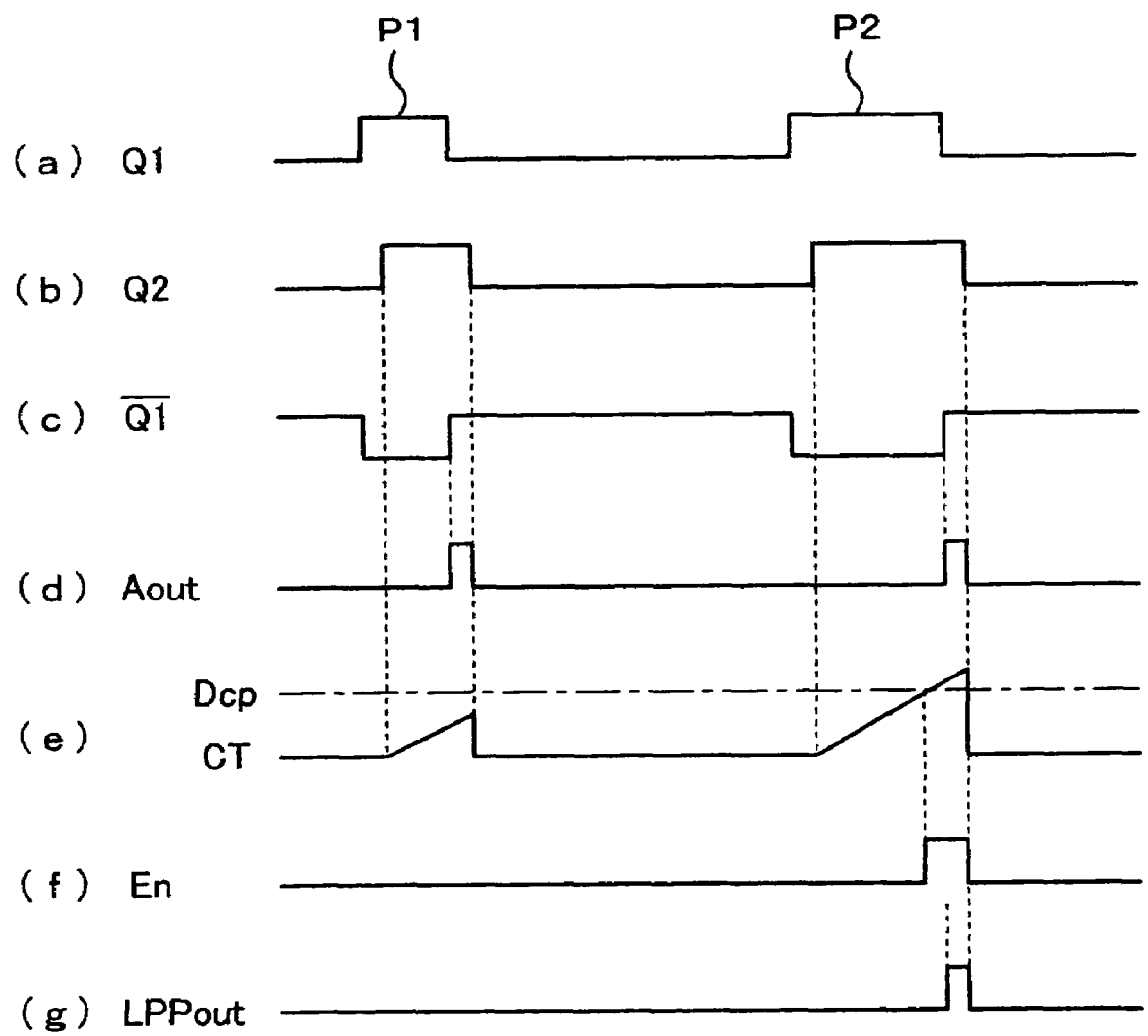
FIG. 3 is a diagram showing waveforms of signals associated with the operation of detecting land pre-pits according to the first embodiment of the present invention.

In FIG. 3, (a), (b), (c), and (d) respectively represent the output Q1 of the D flip-flop 71, the output Q2 of the D flip-flop 72, the inverted signal $\overline{Q1}$ of the output Q1, and the output Aout of the AND gate 73.

The D flip-flop 71 latches the detection signal LPPout' and outputs the latched signal as Q1. The D flip-flop 72 delays the output Q1 by a time equal to the clock period and the delayed signal is output as Q2 from the D flip-flop 72.

AND of the output Q2 shown in FIG. 3(b) and the inverted signal $\overline{Q1}$ shown in FIG. 3(c) is output as Aout from the AND gate 73. As can be seen from FIG. 3(d), the output signal Aout obtained via the above process represents the falling-down edges of the detection signal LPPout'.

When the output Q2 of the D flip-flop 72 rises to "1", the counter 74 starts to count the clock CK. Because the output Q2 is also applied as a reset signal to the D flip-flop 72, when the output Q2 falls down to "0", the count value of the counter 74 is cleared.

Thus, as represented in FIG. 3(e), the count value CT of the counter 74 increases during each period in which the output Q2 is at the level of "1" and the count value CT is reset to 0 when the output Q2 becomes "0".

The comparator 75 compares the count value CT of the counter 74 with a reference value Dcp. The comparison result is output as an enable signal to the holding circuit 76. The reference value Dcp is supplied from the system controller 10. That is, the system controller 10 can vary the reference value Dcp.

The count value CT is compared with the reference value Dcp as shown in FIG. 3(e), and the enable signal En is given by the comparison result as shown in FIG. 3(f).

The holding circuit 76 holds the output Aout of the AND gate 73 for, and only for, a period during which the enable signal En is at the level of "1", and thus the holding circuit 76 outputs a signal as represented by (g) in FIG. 3.

In the above operation, of pulses included in the detection signal LPPout', only those pulses whose pulse width is greater than the particular value are extracted as the edge detection signal as shown in FIG. 3(g), and the land pre-pit detection signal LPPout, which no longer includes noise pulses, is given by this signal (g).

That is, as can be seen from FIG. 3, when pulses of the detection signal LPPout' have a small pulse width (as with a pulse P1 at the output Q1), edge detection pulses thereof do not appear in the final detection signal LPPout, but only when pulse width is greater than the predetermined value (as with a pulse P2 at the output Q1), edge detection pulses thereof appear in the land pre-pit detection signal LPPout.

That is, in the circuit shown in FIG. 2, of pulses output as the land pre-pit detection signal LPPout' from the comparator 61, those pulses whose width is smaller than the predetermined value (specified by the reference value Dcp) are regarded as noise pulses and removed.

As described earlier with reference to FIG. 15, noise pulses have an amplitude smaller than the amplitude of correct pulses SLP corresponding to land pre-pits LPP. Therefore, noise pulses output as a result of comparison from the comparator 61 have a pulse width smaller than the pulse width of correct pulses corresponding to the land pre-pits LPP.

If the noise pulse remover 70 shown in FIG. 2 detects a pulse with a small pulse width, the noise pulse remover 70 regards it as a noise pulse and removes it. As a result, a land pre-pit detection signal LPPout including no noise pulses is obtained.

Thus, in the present embodiment, land pre-pit information can be correctly detected even if the amplitude of the push-pull signal P/P varies due to wobbling of tracks, crosstalk from adjacent tracks, and/or a reduction in reflectance of land pre-hits LPP caused by nearby recording marks.

This allows a reduction dead time before correct land pre-pit information starts to be output, and an improvement in address error rate can be achieved. Furthermore, highly reliable writing/reading is possible even for storage media having large variations in characteristics.

The variation in amplitude of the push-pull signal P/P can also occur due to a variation in characteristics of the pickup (optical head 3). The present embodiment also allows land pre-pit information to be correctly detected even when the push-pull signal P/P has such a variation in amplitude. This allows an improvement in production yield of the pickup.

The threshold of the pulse width employed in detecting noise pulses can be changed by changing the reference value Dcp. For example, by optimizing the reference value Dcp depending on the address error rate or the like, the noise pulse removal performance can be maximized. More specifically, if an increase in address error rate occurs, it can be concluded that the detection signal LPPout supplied to the address decoder 26 includes noise pulses, and the address error rate can be improved by increasing the reference value Dcp thereby increasing the threshold of the pulse width employed in detecting noise pulses.

Although in the noise pulse remover 70 shown in FIG. 2, the falling-down edge detector is formed of the D flip-flops 71 and 72 and the AND gate 73, the circuit configuration of the edge detector is not limited to that shown in FIG. 2. For example, the edge detector may be formed using resistors, capacitors, and a AND gate.

The counter 74 is not limited to a digital counter, but other circuit configurations may be employed. For example, an analog circuit using a resistor and a capacitor may be used to produce a waveform corresponding to the count value CT shown in FIG. 3(e).

Furthermore, the comparator 75 is not limited to particular types, but any circuit having the comparison capability may be used. For example, an analog comparator or an operational amplifier may be used.

As for the holding circuit 76, any circuit configuration may be used, as long as it is possible to output the edge detection pulse in accordance with the result of comparison performed by the comparator 75. For example, the holding circuit 76 may be formed of a capacitor and an analog switch.

In the example shown in FIG. 2, the reference value Dcp is supplied from the system controller 10. Alternatively, the reference value Dcp may be supplied in a different manner. For example, the reference value Dcp may be supplied using a combination of a battery and a switch or using a combination of a voltage source and a variable resistor.

Second Embodiment

Figure 4:
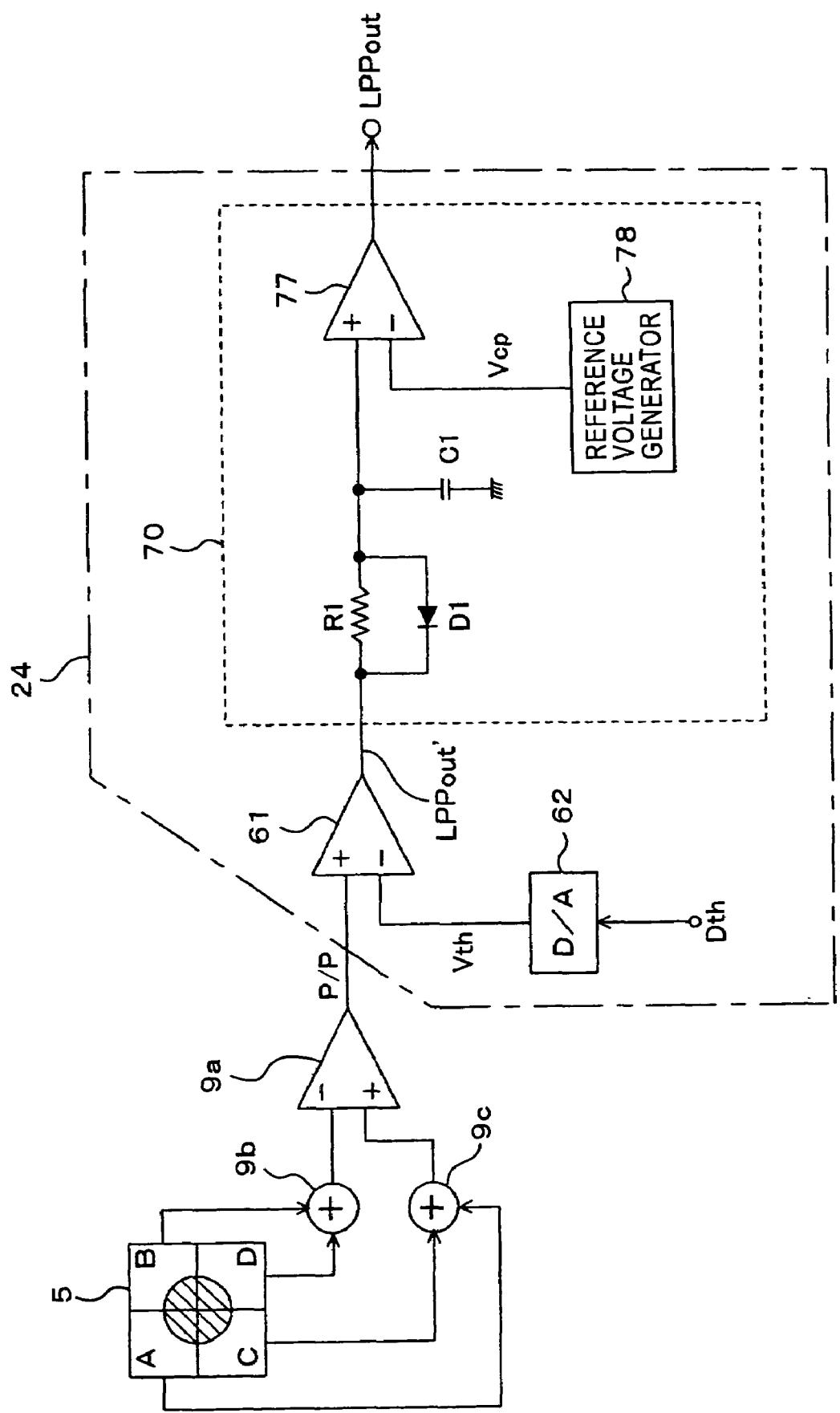
FIG. 4 is a block diagram showing a circuit for detecting land pre-pits according to a second embodiment of the present invention.

Referring to FIG. 4, a circuit configuration including a noise pulse remover 70 according to a second embodiment is described below. The circuit configuration is similar to that according to the first embodiment described above except that the noise pulse remover 70 is configured in an analog form.

As shown in FIG. 4, the noise pulse remover 70 includes a resistor R1, a diode D1, a capacitor C1, a comparator 77, and a reference voltage source 78.

In this circuit configuration, a detection signal LPPout', which might include noise pulses, is supplied from a comparator 61 to the noise pulse remover 70. In the noise pulse remover 70, when the detection signal LPPout' is at a level of "1", the capacitor C1 is charged up by the detection signal LPPout' at a rate corresponding to the time constant determined by the resistance R1.

The charged voltage of the capacitor C1 varies in a similar manner to the count value CT shown in FIG. 3(e) according to the first embodiment described above.

The comparator 77 compares the charged voltage of the capacitor C1 with a reference voltage Vcp supplied from the reference voltage source 78. The result of the comparison becomes similar to the enable signal En shown in FIG. 3(f).

In the circuit configuration shown in FIG. 4, the above-described signal similar to the signal shown in FIG. 3(f) is output as the land pre-pit detection signal LPPout including no noise pulses.

Also in this circuit configuration, pulses having a width smaller than a threshold value is regarded as noise pulses and removed, and thus similar advantages to those achieved in the first embodiment are achieved.

The reference voltage source 78 may be formed of a combination of a battery and a switch or a combination of a voltage source and a variable resistor. Alternatively, the reference voltage source 78 may be replaced with a digital-to-analog converter, and a reference value Dcp supplied from the system controller 10 may be converted into an analog signal and output as the reference voltage Vcp.

Third Embodiment

Figure 5:
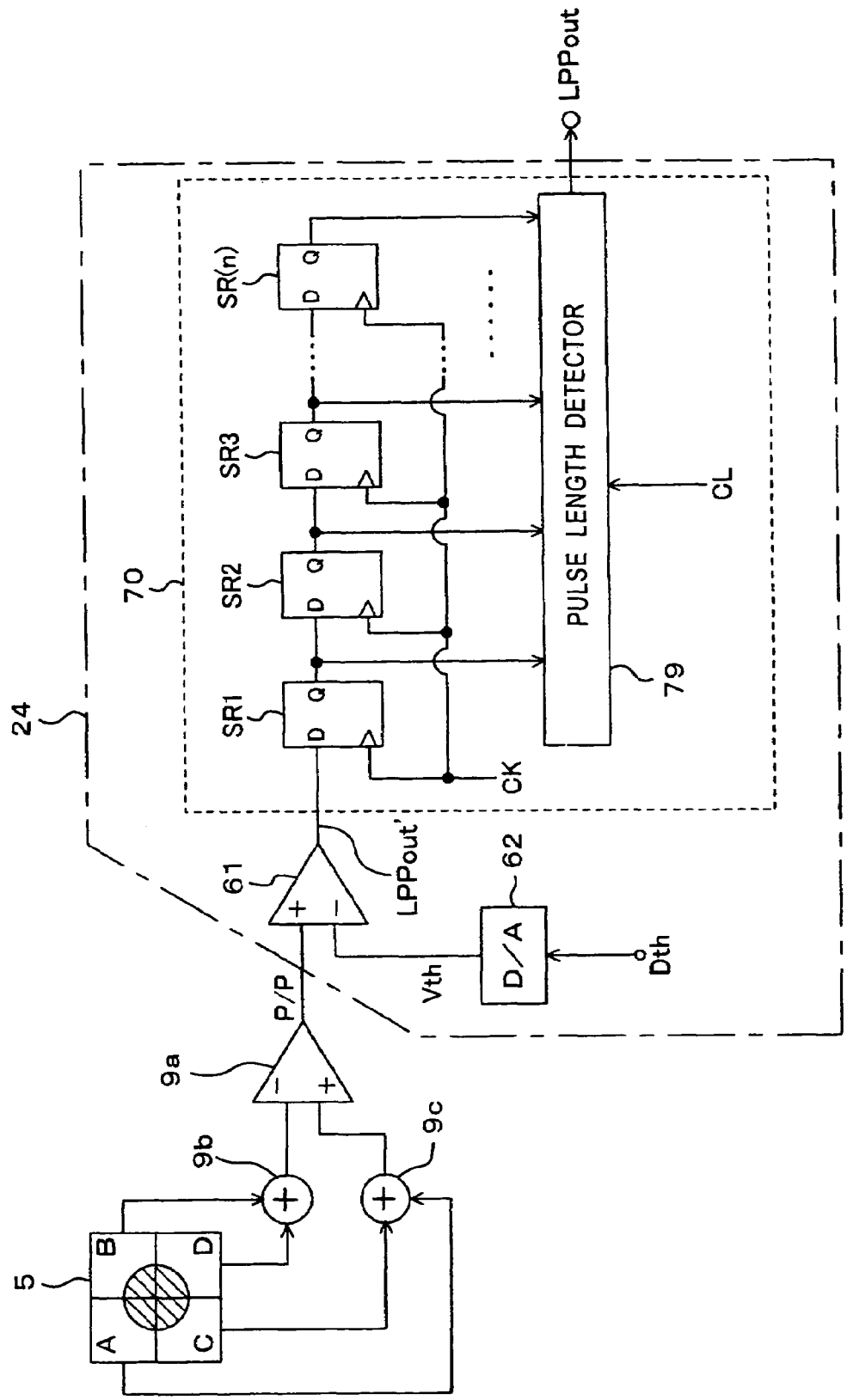
FIG. 5 is a block diagram showing a circuit for detecting land pre-pits according to a third embodiment of the present invention.
Figure 6:
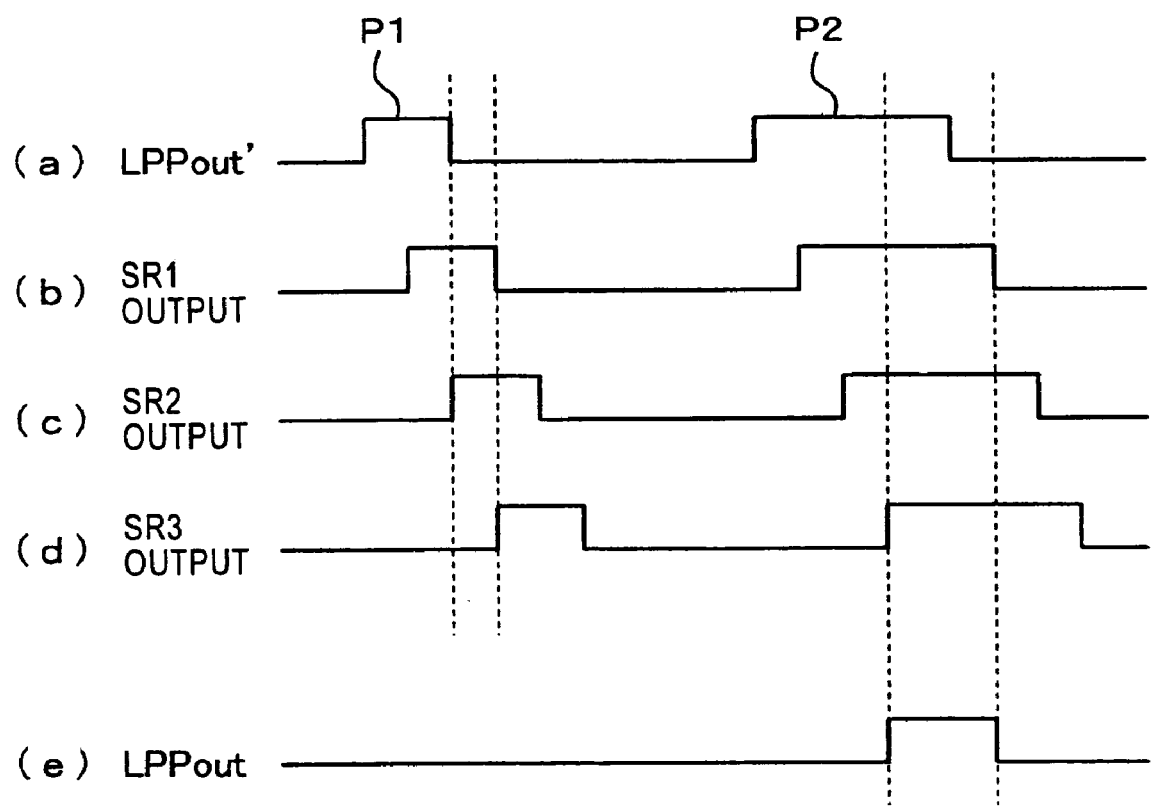
FIG. 6 is a diagram showing waveforms of signals associated with the operation of detecting land pre-pits according to the third embodiment of the present invention.

Referring to FIGS. 5 and 6, a circuit configuration including a noise pulse remover 70 according to a third embodiment is described below. The circuit configuration is similar to that according to the first embodiment described above except that the noise pulse remover 70 is formed using a shift register.

In this third embodiment, the noise pulse remover 70 includes a shift register composed of n flip-flops SR1 to SR(n) and a pulse length detector 79 to which latched signals are supplied from the respective flip-flops SR1 to SR(n).

In the pulse length detector 79, a set value CL is given by the system controller 10, and if outputs of as many or more flip-flops than the set value CL are "1", the output of the pulse length detector 79 becomes "1". The pulse length detector 79 may be realized, for example, using a multiinput AND gate.

FIG. 6 shows waveforms associated with the operation of the noise pulse remover 70.

Also in this noise pulse remover 70, as shown in FIG. 6(a), a detection signal LPPout', which might include noise pulses, is supplied from a comparator 61 to the noise pulse remover 70.

In the noise pulse remover 70, the respective flip-flops SR1 to SR(n) latch input signals with timings according to the clock CK thereby providing output signals that are delayed from the outputs of flip-flops at previous stages, as shown in FIGS. 6(b), (c), and (d).

Herein, let us assume that the set value CL is equal to the total delay time of three flip-flops.

When the pulse length detector 79 calculates the AND of the outputs of the flip-flops SR1 to SR3 for a pulse P1 shown in FIG. 6(a), the result does not become "1". On the other hand, the AND becomes "1" for a pulse P2.

Thus, if the result of the AND operation is employed as the land pre-pit detection signal LPPout, then the resultant land pre-pit detection signal LPPout does not include noise pulses such as P1, as shown in FIG. 6(e).

Thus, also in this third embodiment, as in the first and second embodiments described above, pulses whose width is smaller than a predetermined value are regarded as noise pulses and removed. That is, similar advantages to those achieved in the first or second embodiments are also achieved.

The threshold of the pulse width employed in detecting noise pulses can be changed by changing the set value CL. More specifically, the number of flip-flops whose outputs are subjected to the AND operation in the pulse length detector 79 is varied in accordance with the set value CL.

Fourth Embodiment

In the first to third embodiments described above, noise pulses included in the land pre-pit detection signal LPPout' output from the comparator 61 are removed by the noise pulse remover 70. In the fourth embodiment described below, the reference voltage Vth applied to the comparator 61 for detecting land pre-pits is varied so that the output of the comparator 61 does not include noise pulses.

In this fourth embodiment, the push-pull signal P/P is supplied to a land pre-pit extractor 24 including a comparator 61, a digital-to-analog converter 62, a counter 81, a register 82, and a time measurement unit 83.

As in the circuit configuration shown in FIG. 2, a reference voltage data Dth is supplied to the digital-to-analog converter 62 from the system controller 10. The digital-to-analog converter 43 converts the reference voltage data Dth into a corresponding analog voltage and supplies the resultant analog voltage as a reference voltage Vth to the comparator 61.

The comparator 61 compares the push-pull signal P/P with the reference voltage Vth. If the push-pull signal P/P is greater than the reference voltage Vth, the comparator 61 outputs "1". That is, the result of comparison made by the comparator 61 is output as a pre-pit detection signal LPPout whose level becomes "1" when the push-pull signal P/P is greater than the reference voltage Vth. The resultant land pre-pit detection signal LPPout is supplied to the address decoder 26 shown in FIG. 1.

In this technique, the reference voltage Vth is varied so that noise pulses are not included in the land pre-pit detection signal LPPout.

For the above purpose, the counter 81, the register 82, and the time measurement unit 83 are provided in the land pre-pit extractor 24.

The time measurement unit 83 measures the elapse of time corresponding to the period of 16 wobbles and the time measurement unit 83 outputs a "1"-level pulse signal S1 every elapse of time.

FIG. 8(a) shows a push-pull signal P/P whose amplitude varies due to wobbling, and FIG. 8(b) shows the signal S1 that rises up to level "1" every 16-wobble period.

The time measurement unit 83 may be realized using a counter for counting the wobble clock WCK and a circuit for generating a "1"-level pulse each time the count value of the counter reaches a value corresponding to the 16-wobble period.

The 16-wobble period is not necessarily needed to be synchronized with the wobble clock WCK, and the 16-wobble period may be measured using a hardware counter that simply counts elapse of time or may be measured by a software program running on the system controller 10. More specifically, each time the time measurement unit detects elapse of time corresponding to 16-wobble period, which is equal to about 4.5 µs, the time measurement unit outputs a pulse.

The 16-wobble period is equal to the sum of two frames shown in FIG. 13. As can be seen from FIG. 13, in each period of two frames, one to thee pulses included in the land pre-pit detection signal LPPout must be detected. In other words, there can be no 16-wobble period during which no pulse appears in the land pre-pit detection signal LPPout, and there can be no 16-wobble period during which four or more pulses appear in the land pre-pit detection signal LPPout.

The counter 81 counts the pulses of the land pre-pit detection signal LPPout output from the comparator 61.

The signal S1 output from the time measurement unit 83 is applied as a reset signal to the counter 81 so that the count value is cleared every 16-wobble period.

The counter 81 is not limited to a particular type, but any type of count may be used as long as it is capable of outputting information indicating the measured number of pulses. For example, the number of pulses may be counted by charging a capacitor by pulses.

The register 82 holds the count value of the counter 81. For example, a D flip-flop may be used as the register 82. The signal S1 output from the time measurement unit 83 is applied as an enable signal to the register 82. This causes the count value of the counter 81 to be loaded into the register 82 every 16-wobble period and held over the next 16-wobble period.

The count value held by the register 82 is supplied to the system controller 10.

The register 82 is not limited to a particular type, but any type of register 82 may be used. For example, the register 82 may be realized using an analog switch and a capacitor.

The signal S1 output from the time measurement unit 83 is also supplied as an interrupt signal to the system controller 10. In response to receiving the interrupt signal, the system controller 10 varies the reference voltage data Dth in accordance with the count value supplied from the register 82.

Figure 9:
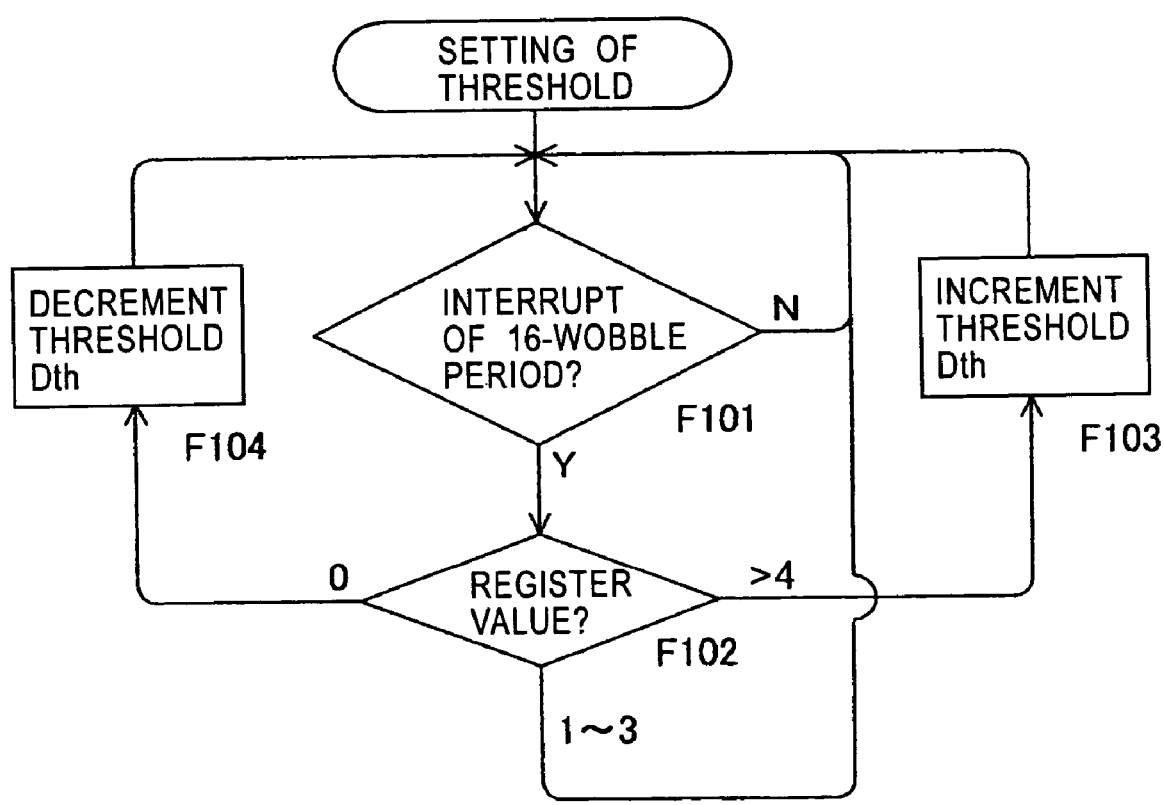
FIG. 9 is a flow chart showing a process of setting a threshold value used in detecting land pre-pits according to the fourth embodiment of the present invention.

With reference to FIG. 9, the process performed by the system controller 10 to vary the reference voltage data Dth is described below.

In step F101, the system controller 10 waits for an interrupt signal (signal S1) from the time measurement unit 83. If an interrupt signal is detected, the process proceeds to step F102. In step F102, the count value held in the register 82 is examined. If the count value is equal to one of 1, 2, and 3, the process returns to F101 to wait for next interrupt signal without changing the reference voltage data Dth.

In the case in which it is determined in step F102 that the count value is equal to 0, the process proceeds to step S104. In step F104, the reference voltage data Dth is reduced by one level so that the reference voltage Vth supplied to the comparator 61 via the digital-to-analog converter 62 is reduced by one level.

In the case in which it is determined in step F102 that the count value is equal to or greater than 4, the process proceeds to step F103. In step F103, the reference voltage data Dth is increase by one level so that the reference voltage Vth supplied to the comparator 61 via the digital-to-analog converter 62 is increased by one level.

Figure 7:
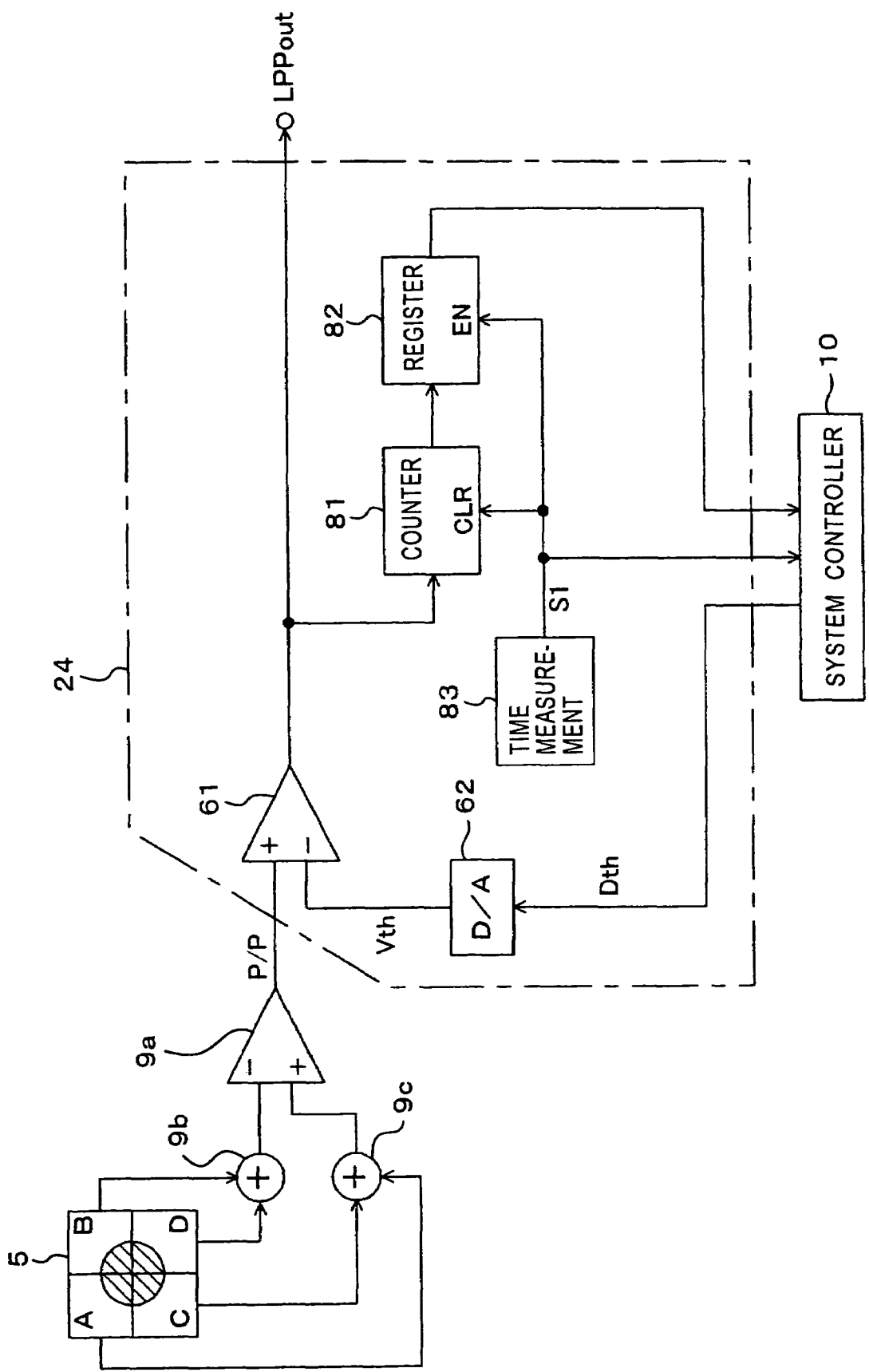
FIG. 7 is a block diagram showing a circuit for detecting land pre-pits according to a fourth embodiment of the present invention.
Figure 8:
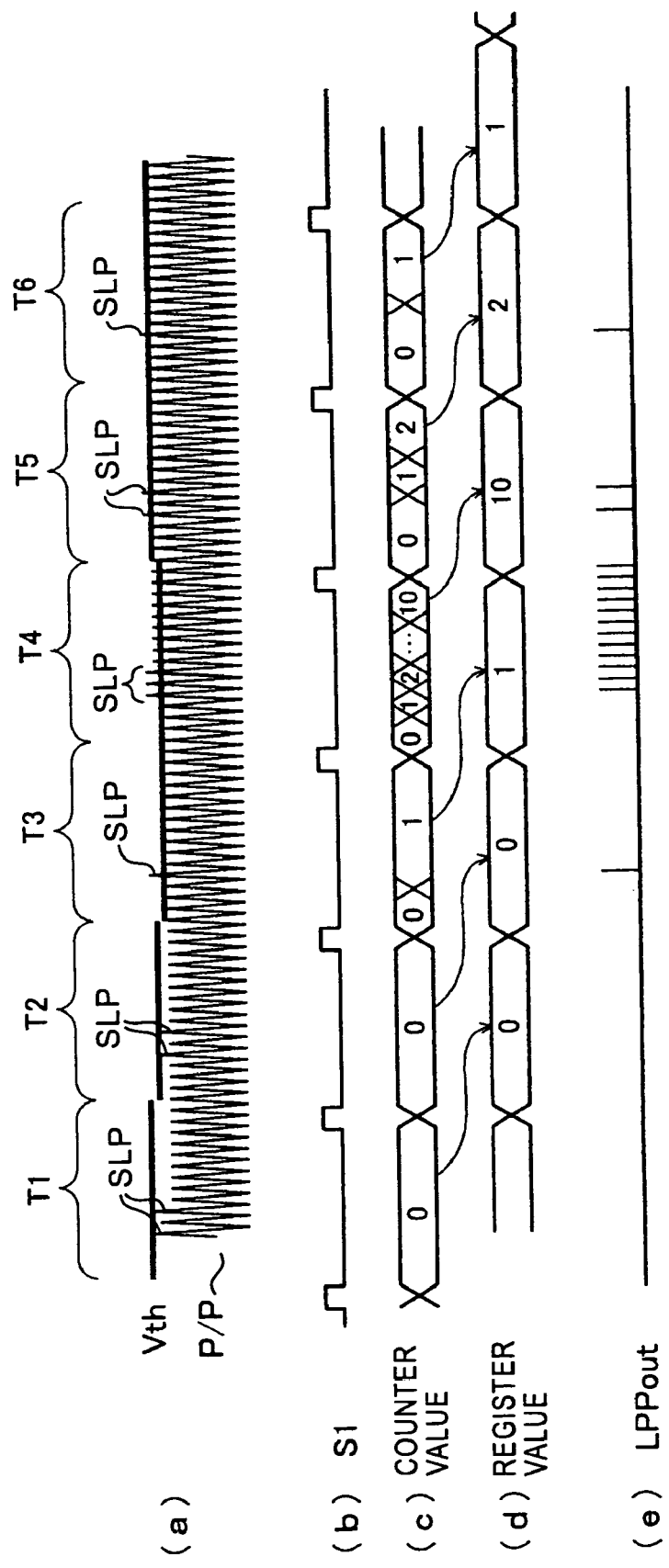
FIG. 8 is a diagram showing waveforms of signals associated with the operation of detecting land pre-pits according to the fourth embodiment of the present invention.

With reference to FIG. 8, the operation of the land pre-pit extractor 24 shown in FIG. 7 is described below.

In FIG. 8, each of T1 to T6 denotes a 16-wobble period. As described above, the signal S1 shown in FIG. 8(*b*) rises up to "1" once every 16-wobble period (T1 to T6).

In period T1, no pulses SLP corresponding to correct land pre-pits appear in the detection signal LPPout (FIG. 8(*e*)), because the reference voltage Vth applied to the comparator 61 is too high.

In this case, because no pulses are included in the detection signal LPPout output from the comparator 61, the count value of the counter 81 is equal to 0, as shown in FIG. 8(*c*), and the count value of 0 is held by the register 82 in synchronization with the signal S1, as shown in FIG. 8(*d*).

At the time at which this signal S1 is applied to the system controller 10, the system controller 10 performs the process shown in FIG. 9. In this specific case, because the register value is equal to 0, the process proceeds to step F104 to reduce the reference voltage data Dth.

As a result, the reduced reference voltage Vth is used in the next period T2.

In period T2, the process is performed in a similar manner to period T1. In this period T2, the reference voltage Vth is still too high, and thus the count value is still maintained at 0. As a result, when the signal S1 is applied to the system controller 10, the system controller 10 performs the process shown in FIG. 9. As a result, the reference voltage data Dth is further reduced. Thus, the reduced reference voltage Vth is used in the next period T3.

In period T3, the amplitudes of pulses SLP corresponding to land pre-pits LPP become greater than the reference voltage Vth, and a pulse correctly appears in the land pre-pit detection signal LPPout as shown in FIG. 8(*e*).

In this period T3, one pulse appears in the land pre-pit detection signal LPPout, and thus data of "0" described earlier with reference to FIG. 13 is correctly detected.

In this case, the counter 81 correctly counts the number of pulses as 1, and the count value of 1 is held by the register 82.

In this specific case, because the register value is equal to 1, the reference voltage data Dth is not changed in the process performed by the system controller 10 in response to receiving the signal S1. Therefore, the same reference voltage Vth is used in the next period T4.

However, in period T4, an increase in the amplitude of the push-pull signal P/P occurs for some reason, and not only the amplitudes of correct pulses SLP corresponding to land pre-pits LPP but also the amplitudes of noise pulses exceed the reference voltage Vth. For example, let us assume that ten pulses appear in the detection signal LPPout as a result of the increase in the amplitude of the push-pull signal P/P.

As a result, the counter 81 counts the number of pulses as 10, and the count value of 10 is held by the register 82. Thus, in the process performed by the system controller 10, the reference voltage data Dth is increased in step F103.

As a result, the increased reference voltage Vth is used in the next period T5.

In period T5, the increase in the reference voltage Vth causes only correct pulses SLP to be detected in the detection signal LPPout as shown in FIG. 8(*e*).

In this specific case, the count value of 2 is held by the register value, and thus in the process performed by the system controller 10, the reference voltage data Dth is not changed. As a result, the same reference voltage Vth is used in the next period T6.

In the present embodiment, as can be understood from the above discussion, the reference voltage Vth that is compared with the push-pull signal P/P is convergently varied to a value that allows pulses corresponding to land pre-pits LPP to correctly appear in the land pre-pit detection signal LPPout.

This means that even if the initial value of the reference voltage Vth is not proper, the reference voltage Vth is led to a proper value. Furthermore, if the current reference voltage Vth becomes improper due to a variation in the amplitude of the push-pull signal P/P, the reference voltage Vth is led to a proper value.

That is, if a noise pulse is detected in the land pre-pit detection signal LPPout, the reference voltage Vth is increased so that the land pre-pit detection signal is led into a state in which the land pre-pit detection signal includes no noise pulses. On the other hand, if correct pulses SLP corresponding to land pre-pits LPP are not detected, the reference voltage Vth is reduced to a value that allows pulses SLP corresponding to land pre-pits LPP to be correctly detected in the land pre-pit detection signal LPPout.

Thus, in the present embodiment, the land pre-pit detection signal LPPout including only pulses SLP corresponding to land pre-pits LPP and including no noise pulses is obtained without being influenced by a variation in amplitude of the push-pull signal P/P due to wobbling or noise and without being influenced by a reduction in amplitude of pulses SLP due to interference of recording marks.

This allows a reduction dead time before correct land pre-pit information starts to be output, and an improvement in address error rate can be achieved. Furthermore, highly reliable writing/reading is possible even for storage media having large variations in characteristics.

The variation in amplitude of the push-pull signal P/P can also occur due to a variation in characteristics of the pickup (optical head 3). The present embodiment also allows land pre-pit information to be correctly detected even when the push-pull signal P/P has such a variation in amplitude. This allows an improvement in production yield of the pickup.

Although in the present embodiment, the reference voltage Vth is controlled in the process shown in FIG. 9 performed by the system controller 10, the reference voltage Vth may be controlled by a control system constructed using a hardware logic circuit or may be controlled by an analog circuit in accordance with an analog signal corresponding to the number of pulses.

Fifth Embodiment

Figure 10:
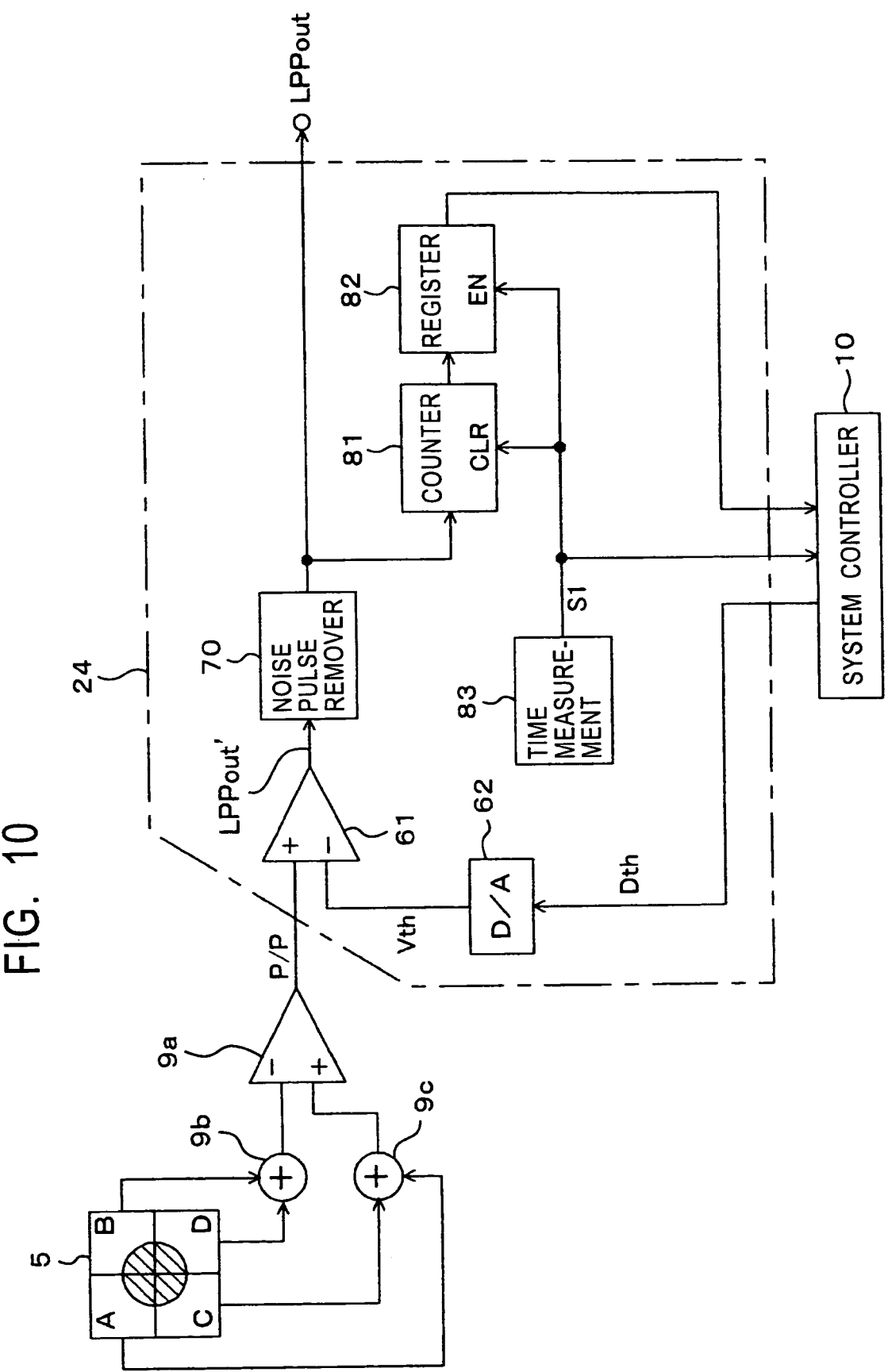
FIG. 10 is a block diagram showing a circuit for detecting land pre-pits according to a fifth embodiment of the present invention.

With reference to FIG. 10, a fifth embodiment of the present invention is described below.

In this fifth embodiment shown in FIG. 10, the noise pulse remover 70 used in the first to third embodiment is added to the circuit configuration used in the fourth embodiment described above with reference to FIG. 7.

A detection signal LPPout' output from a comparator 61 might include noise pulses. If a noise pulse is included in the detection signal LPPout', the noise pulse is removed by the noise pulse remover 70, and a land pre-pit detection signal LPPout including no noise pulse is output to the address decoder 26.

The noise pulse remover 70 may be constructed in a similar manner to that shown in FIG. 2, 4, or 5.

The circuit configurations and the operations of a counter 81, a register 82, and a time measurement unit 83 are similar to those used in the fourth embodiment described above. Furthermore, the system controller 10 controls the reference voltage data Dth thereby controlling the reference voltage Vth by performing the process shown in FIG. 9 in a similar manner to the fourth embodiment described above.

In the case of the circuit configuration shown in FIG. 10, the counter 81 counts the number of pulses included in the land pre-pit detection signal LPPout output from the noise pulse remover 70 for each 16-wobble interval, and the reference voltage Vth is controlled in accordance with the count value.

Thus, in the case of the circuit configuration shown in FIG. 10, even if the detection signal LPPout' output from the comparator 61 includes a noise pulse, the noise is removed by the noise pulse remover 70 and noise-free land pre-pit detection signal LPPout is output.

Furthermore, the reference voltage Vth is controlled at a proper level so as to further compress noise pulses in the output of comparator 61.

The combination of the noise pulse remover 70 and the control of the threshold voltage Vth makes it possible to obtain more precise land pre-pit detection signal LPPout than can be achieved by the previous embodiments.

As described earlier in the second to fourth embodiments, the threshold of the pulse width employed by the noise pulse remover 70 in detecting noise pulses can be changed. The threshold of the pulse width may be controlled in accordance with the counted number of pulses (that is, the value held in the register 82).

Sixth Embodiment

Figure 11:
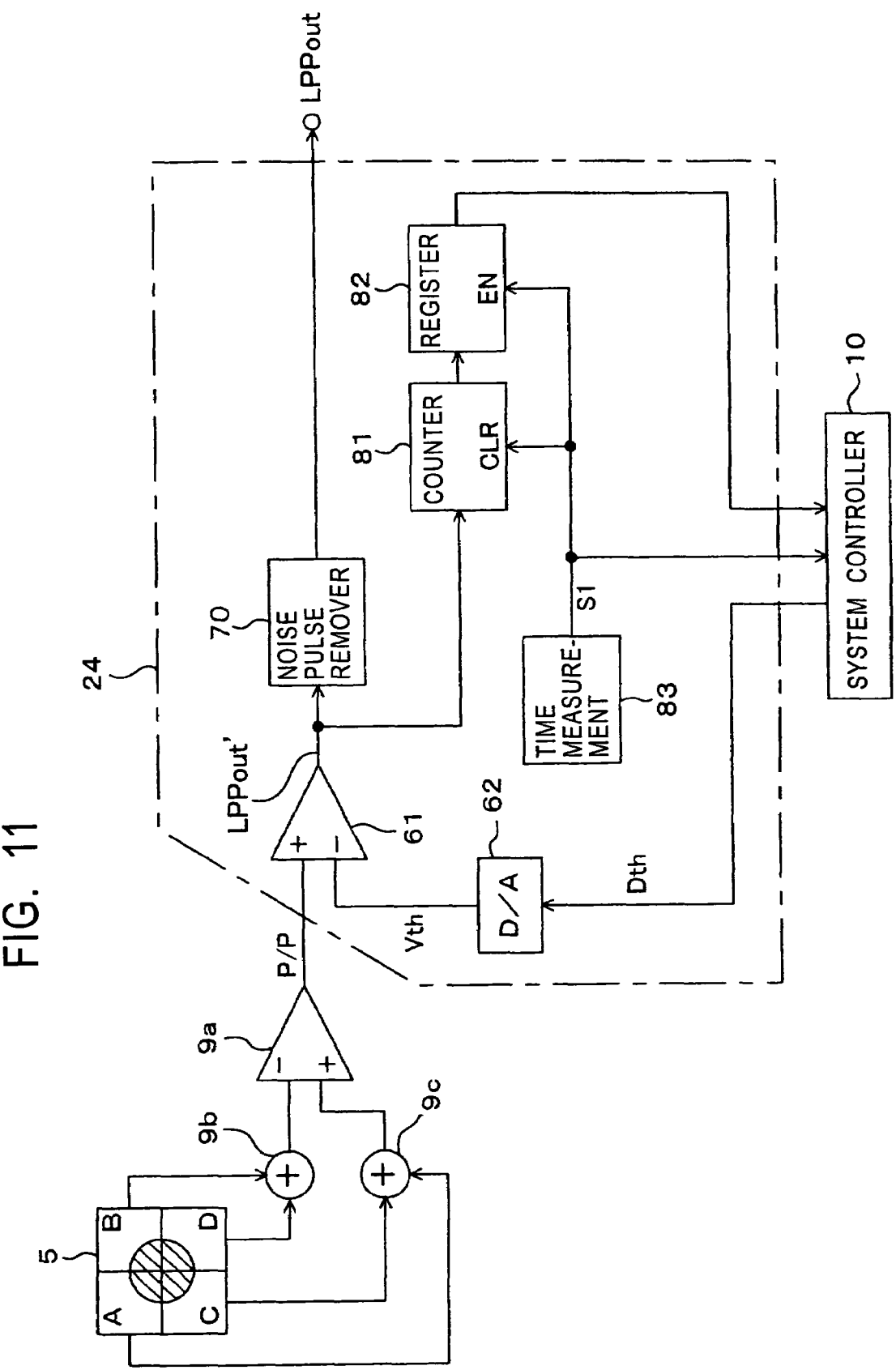
FIG. 11 is a block diagram showing a circuit for detecting land pre-pits according to a sixth embodiment of the present invention.
Figure 12:
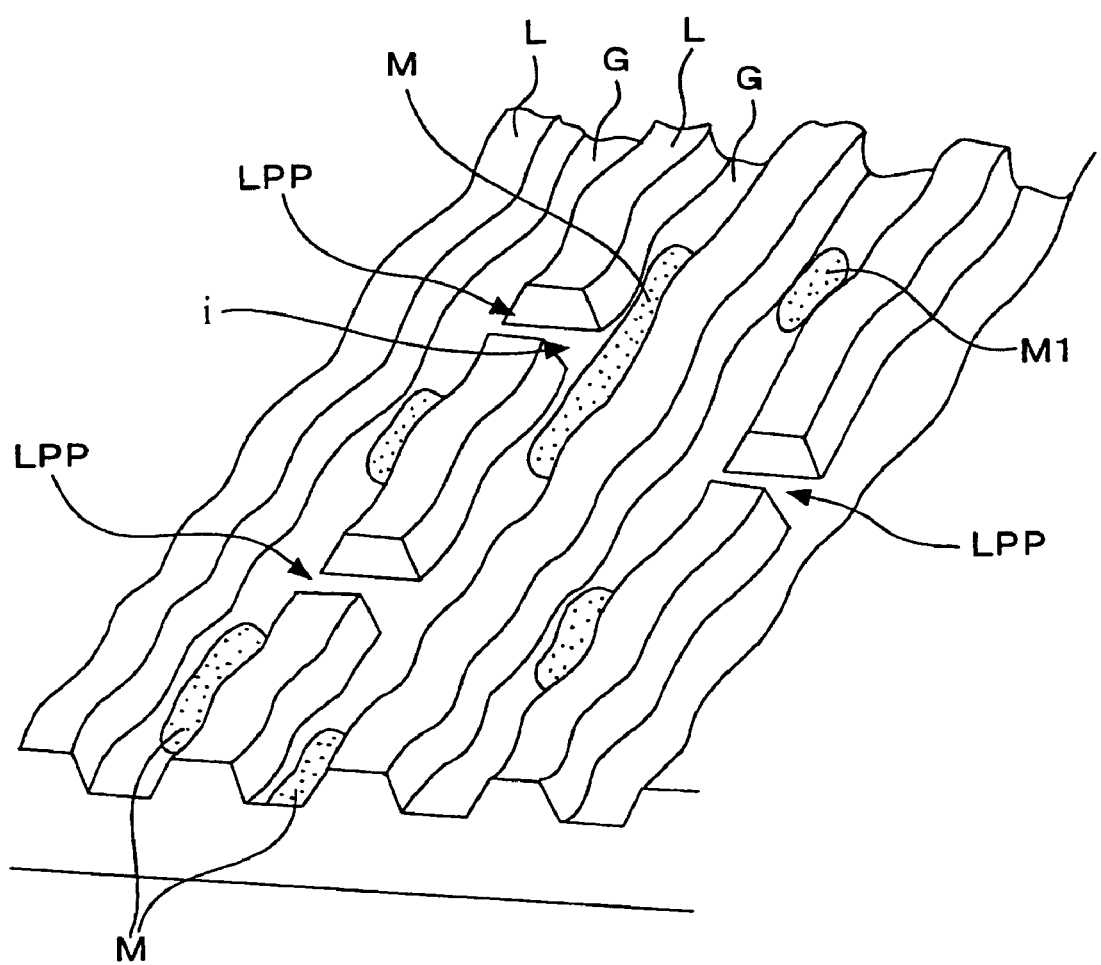
FIG. 12 is a diagram showing a disk having land pre-pits formed thereon.

Referring to FIG. 11, a circuit configuration according to a sixth embodiment is described below.

In this sixth embodiment, as in the fifth embodiment, noise pulses are removed by a noise pulse remover 70, and the reference voltage Vth is controlled by a counter 81, a register 82, and a time measurement unit 83, in conjunction with the process shown in FIG. 9 performed by the controller 10, wherein the counter 81, the register 82, and the time measurement unit 83 are similar to those used in the fifth embodiment.

In this sixth embodiment, unlike the fifth embodiment in which the counter 81 counts the number of pulses included in the land pre-pit detection signal LPPout output from the noise remover 70, the counter 81 counts the number of pulses included in the detection signal LPPout' which is output from the comparator 61 and which might include noise pulses.

In the circuit configuration according to the fifth embodiment with reference to FIG. 10, because the counter 81 counts the number of pulses included in the detection signal LPPout output from the noise pulse remover 70, the probability is low that the count value becomes anomalous, which will make it necessary to change the reference voltage Vth.

In other words, in the fifth embodiment shown in FIG. 10, the reference voltage Vth is changed only when the reference voltage Vth becomes so improper that the noise pulse remover 70 cannot remove noise pulses.

In contrast, in the sixth embodiment shown in FIG. 11, because the counting of the number pulses is performed for the detection signal LPPout' that is not yet subjected to noise removal, the probability is relatively high that the count value becomes anomalous, which will make it necessary to change the reference voltage Vth.

That is, in the sixth embodiment, the number of noise pulses included in the detection signal LPPout' output from the comparator 61 is minimized by controlling the reference voltage Vth, and noise pulses that are still included in the detection signal LPPout' are removed by the noise pulse remover 70.

In this sixth embodiment, as with fifth embodiment, a precise land pre-pit detection signal LPPout can be obtained.

The present invention has been described in detail with reference to specific embodiments. Note that the present invention is not limited to those specific embodiment, but various modifications are possible without departing from the spirit and the scope of the present invention.

As can be understood from the above description, the present invention provides great advantages. That is, in the present invention, noise pulses included in the land pre-pit detection signal obtained by comparing the push-pull signal with the reference voltage are detected on the basis of the pulse width, and the detected noise pulses are removed thereby obtaining a correct pre-pit detection signal.

Furthermore, the number of pulses included in the land pre-pit detection signal is counted, and the reference voltage is controlled in accordance with the counted number of pulses.

The noise pulse removal and the control of the threshold voltage make it possible to correctly detect land pre-pits even when the amplitude of the push-pull signal varies due to wobbling of tracks, crosstalk from adjacent tracks, interference of recording marks, variations in characteristics of a disk, and/or for other reasons, or even when push-pull signal includes large noise.

That is, even when the land pre-pit detection signal includes an error due to a variation in the amplitude of the push-pull signal, the error is removed by removing noise pulses thereby finally outputting a correct land pre-pit detection signal including no errors.

When the detection signal include noise pulses due to a variation in amplitude of the push-pull signal, the reference voltage can be adjusted so that the detection signal includes no noise pulses.

This allows a reduction dead time before correct land pre-pit information starts to be output, and an improvement in address error rate can be achieved. Furthermore, highly reliable writing/reading is possible even for storage media having a large variation in amplitude.

Furthermore, detection errors of land pre-pits due to a variation in characteristic of the pickup also decrease. This contributes to an improvement in production yield of the pickup.

What is claimed is:

1. A disk drive comprising:

an optical head for emitting a laser beam so as to illuminate a disk-shaped storage medium thereby writing or reading data on or from the disk-shaped storage medium, grooves serving as recording tracks being formed in a wobbling fashion on the disk-shaped storage medium, pre-pits being formed on lands between adjacent grooves;

a push-pull signal generator for generating a push-pull signal from reflected-light information detected by the optical head;

a pre-pit detector for comparing the push-pull signal with a reference signal and outputting a comparison result as a pre-pit detection signal;

a counter for counting the number of pulses included in the detection signal output from the pre-pit detector, for each of predetermined periodic intervals; and a controller for changing the reference signal depending on the count value of the counter.

2. A disk drive according to claim 1, wherein
the disk-shaped storage medium represents, using the pre-pits, address information indicating an address on the disk; and the disk drive further comprising an address decoder for acquiring the address information represented by the pre-pits, from the noise-removed detection signal.

3. A disk drive according to claim 2, wherein the controller controls the reference signal such that the level of the reference signal is reduced when the count value is greater than a predetermined value, while the level of the reference signal is increased when the count value is smaller than the predetermined value.

4. A disk drive according to claim 1, wherein the controller controls the reference signal such that the level of the reference signal is reduced when the count value is greater than a predetermined value, while the level of the reference signal is increased when the count value is smaller than the predetermined value.

5. A method of detecting pre-pits formed on a disk-shaped storage medium, grooves serving as recording tracks being formed in a wobbling fashion on the disk-shaped storage medium, address information being represented by the pre-pits formed on lands between adjacent grooves, the method comprising the steps of:

generating a push-pull signal from reflected-light information obtained when the disk-shaped storage medium is illuminated with a laser beam;

comparing the push-pull signal with a reference signal and outputting a comparison result as a pre-pit detection signal;

counting the number of pulses included in the output detection signal, for each of predetermined periodic intervals; and changing the reference signal depending on the count value.

6. A disk drive comprising:

an optical head for emitting a laser beam so as to illuminate a disk-shaped storage medium thereby writing or reading data on or from the disk-shaped storage medium, grooves serving as recording tracks being formed in a wobbling fashion on the disk-shaped storage medium, pre-pits being formed on lands between adjacent grooves;

a push-pull signal generator for generating a push-pull signal from reflected-light information detected by the optical head;

a pre-pit detector for comparing the push-pull signal with a reference signal and outputting a comparison result as a pre-pit detection signal, said pre-pit detection signal including a pulse having a pulse width;

a noise remover for detecting a noise pulse on the basis of the pulse width of the pulse included in the detection signal output from the pre-pit detector, removing the noise pulse from the detection signal, and output the detection signal including no noise pulse;

a counter for counting the number of pulses included in the detection signal output from the pre-pit detector or included in the detection signal output from the noise remover, for each of predetermined periodic intervals;

a controller for changing the reference signal depending on the count value of the counter; and an address decoder for acquiring the address information represented by the pre-pits, from the noise-removed detection signal.

7. A disk drive according to claim 6, wherein
the pre-pits on the disk-shaped storage medium are encoded as represents, using the pre-pits, address information indicating an address on the disk; and the disk drive further comprising an address decoder for acquiring the address information represented by the pre-pits, from the noise-removed detection signal.

8. A disk drive according to claim 6, wherein the noise remover includes a pulse width detector for detecting the pulse width of a pulse included in the detection signal output from the pre-pit detector, and wherein when a pulse with a pulse width smaller than a predetermined value is detected by the pulse width detector, the noise remover removes the detected pulse as a noise pulse.

9. A disk drive according to claim 8, wherein the noise remover is capable of changing the reference value of the pulse width.

10. A method of detecting pre-pits formed on a disk-shaped storage medium, grooves serving as recording tracks being formed in a wobbling fashion on the disk-shaped storage medium, address information being represented by the pre-pits formed on lands between adjacent grooves, the method comprising the steps of:

generating a push-pull signal from reflected-light information obtained when the disk-shaped storage medium is illuminated with a laser beam;

comparing the push-pull signal with a reference signal and outputting a comparison result as a pre-pit detection signal including a pulse having a pulse width;

detecting a noise pulse on the basis of the pulse width of the pulse included in the output detection signal, removing the detected noise pulse from the detection signal, and outputting the detection signal including no noise pulse;

counting the number of pulses included in the output detection signal, for each of predetermined periodic intervals; and changing the reference signal depending on the count value.

* * * * *